(12) United States Patent
Wu et al.

(10) Patent No.: US 10,162,394 B2
(45) Date of Patent: Dec. 25, 2018

(54) SYSTEMS AND METHODS FOR SUSTAINABLE SELF-COOLING OF CENTRAL PROCESSING UNIT THERMAL HOT SPOTS USING THERMOELECTRIC MATERIALS

(71) Applicant: ARIZONA BOARD OF REGENTS ON BEHALF OF ARIZONA STATE UNIVERSITY, Tempe, AZ (US)

(72) Inventors: Carole-Jean Wu, Tempe, AZ (US); Patrick Phelan, Tempe, AZ (US); Soochan Lee, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 237 days.

(21) Appl. No.: 14/850,920

(22) Filed: Sep. 10, 2015

(65) Prior Publication Data

US 2016/0070318 A1    Mar. 10, 2016

Related U.S. Application Data

(60) Provisional application No. 62/048,364, filed on Sep. 10, 2014.

(51) Int. Cl.
*G06F 1/16* (2006.01)
*H05K 5/00* (2006.01)
*H05K 7/00* (2006.01)
*G06F 1/20* (2006.01)

(52) U.S. Cl.
CPC ..................................... *G06F 1/20* (2013.01)

(58) Field of Classification Search
CPC ....... H05K 2201/10219; H05K 7/2039; H05K 7/20436; H05K 7/205; H01M 10/6572; H02S 10/30; G02B 6/4266–6/4273; H02K 9/22; G06F 1/20; G06F 1/203; G06F 1/206
USPC ........................ 361/679.46–679.54, 688–723
See application file for complete search history.

(56) References Cited

U.S. PATENT DOCUMENTS

| | | | | |
|---|---|---|---|---|
| 5,380,956 A | * | 1/1995 | Loo | ........................ H01L 23/473 174/17 CT |
| 6,143,975 A | * | 11/2000 | Liao | ........................ G06F 1/203 136/201 |
| 6,233,960 B1 | * | 5/2001 | Kang | ..................... H01L 23/445 257/E23.096 |
| 6,396,700 B1 | * | 5/2002 | Chu | ......................... H01L 23/34 165/185 |
| 6,424,533 B1 | | 7/2002 | Chu et al. | |
| 6,588,217 B2 | | 7/2003 | Ghoshal | |

(Continued)

OTHER PUBLICATIONS

S. Biswas et al., "Fighting Fire with Fire: Modeling the Datacenter-Scale Effects of Targeted Superlattice Thermal Management", In Proceedings of the 38th Annual International Symposium on Computer Architecture, ISCA'11, pp. 331-340 (2011).

(Continued)

*Primary Examiner* — Anthony Haughton
(74) *Attorney, Agent, or Firm* — Polsinelli PC

(57) ABSTRACT

Embodiments of a sustainable self-cooling framework for processors using thermoelectric generators that power an arrangement of thermoelectric coolers to reduce the temperature of thermal hot spots generated by a processor are disclosed.

20 Claims, 19 Drawing Sheets

(56) References Cited

U.S. PATENT DOCUMENTS

| | | | |
|---|---|---|---|
| 7,185,500 B2 | 3/2007 | Meir | |
| 7,436,059 B1* | 10/2008 | Ouyang | H01L 23/34 257/712 |
| 7,942,010 B2* | 5/2011 | Bell | F02G 1/043 62/3.2 |
| 7,974,090 B2* | 7/2011 | Risher-Kelly | G06F 1/1632 165/185 |
| 7,997,087 B2 | 8/2011 | Venkatasubramanian et al. | |
| 8,559,197 B2* | 10/2013 | Cullinane | H02P 9/02 363/37 |
| 8,659,903 B2 | 2/2014 | Schwartz | |
| 8,754,491 B2* | 6/2014 | Abraham | H01L 27/222 257/421 |
| 8,822,807 B2* | 9/2014 | Konig | H01L 35/08 136/201 |
| 2001/0052234 A1* | 12/2001 | Venkatasubramanian | F25B 21/02 62/3.2 |
| 2006/0243317 A1* | 11/2006 | Venkatasubramanian | H01L 35/00 136/206 |
| 2007/0283702 A1* | 12/2007 | Strnad | F25B 21/00 62/3.2 |
| 2008/0229759 A1* | 9/2008 | Ouyang | H01L 23/38 62/3.3 |
| 2010/0257871 A1* | 10/2010 | Venkatasubramanian | H01L 23/38 62/3.7 |
| 2012/0204577 A1* | 8/2012 | Ludwig | F25B 21/04 62/3.3 |
| 2014/0119766 A1* | 5/2014 | Kuroda | G03G 21/206 399/88 |

OTHER PUBLICATIONS

D. Brooks et al., "Dynamic Thermal Management for High-Performance Microprocessors", in Proceedings of the 7th International Symposium on High-Performance Computer Architecture, Monterrey, Mexico (2001).

E.J. Carlson et al., "A 20 mV Input Boost Converter With Efficient Digital Control for Thermoelectric Energy Harvesting", IEEE Journal of Solid-State Circuits, vol. 45, No. 4, , pp. 741-750 (2010).

I. Chowdhury et al., "On-chip cooling by superlattice-based thin-film thermoelectrics", Nature Nanotechnology I vol. 4, pp. 235-248 (2009).

M.H.A. Elnagger et al., "Experimental analysis and FEM simulation of finned U-shape multi heat pipe for desktop PC cooling", Energy Conversion and Management 52 2937-2944 (2011).

K. Fukutani et al., "Design of Bulk Thermoelectric Modules for Integrated Circuit Thermal Management", IEEE Transactions on Components and Packaging Technologies, vol. 29, No. 4, pp. 750-757 (2006).

C.A. Gould et al., "Thermoelectric cooling of microelectronic circuits and waste heat electrical power generation in a desktop personal computer", Materials Science and Engineering B 176 pp. 316-325 (2011).

W. Huang et al., "HotSpot: A Compact Thermal Modeling Methodology for Early-Stage VLSI Design", IEEE Transactions on Very Large Scale Integration (VLSI) Systems, vol. 14, No. 5, pp. 501-513 (2006).

D. Koester et al., "Embedded thermoelectric coolers for semiconductor hot spot cooling," in Proceedings of the 10th Intersociety Conference on Thermal and Thermomechanical Phenomena in Electronics Systems, pp. 491-496, (2006).

J.S. Lee et al., "Predictive Temperature-Aware DVFS", IEEE Trans. on Computers, vol. 59, No. 1, pp. 127-133, (2010).

S. Li et al., "McPAT: An Integrated Power, Area, and Timing Modeling Framework for Multicore and Manycore Architectures", in Proceedings of the IEEE/ACM International Symposium on Microarchitecture MICRO'09, (2009).

R. Mahajan, C.-P. Chiu, and G. Chrysler, "Cooling a microprocessor chip," Proceedings of the IEEE, vol. 94, No. 8, pp. 1476-1486 (2006).

A. Majumdar, "Thermoelectric devices: Helping chips to keep their cool," Nature Nanotechnology, vol. 4, pp. 214-215 (2009).

P. Phelan, V. Chiriac, and T.-Y. Lee, "Current and future miniature refrigeration cooling technologies for high power microelectronics," in Proceedings of the 17th IEEE Semiconductor Thermal Measurement and Management Symposium, pp. 158-167 (2001).

Y. Ramadass and A. Chandrakasan, "A battery-less thermoelectric energy harvesting interface circuit with 35 mV startup voltage," IEEE Journal of Solid-State Circuits, vol. 46, No. 1, pp. 333-341 (2011).

I. Sauciuc et al., "Thermal devices integrated with thermoelectric modules with applications to cpu cooling", in Proceedings of ASME InterPACK (2005).

I. Sauciuc et al., "Thermal performance and key challenges for future CPU cooling technologies", in Proceedings of ASME InterPACK (2005).

K. Skadron et al., "Control-Theoretic Techniques and Thermal-RC Modeling for Accurate and Localized Dynamic Thermal Management", in Proceedings of the 8th International Symposium on High Performance Computer Architecture,(2002).

G.J. Snyder et al., "Hot Spot Cooling using Embedded Thermoelectric Coolers", in Proceedings of the 22nd IEEE Semiconductor Thermal Measurement and Management Symposium (2006).

J. Srinivasan et al., "The case for lifetime reliability-aware microarchitecture", in Proceedings of the 31st Annual International Symposium on Computer Architecture (2004).

J. Srinivasan et al., "Predictive dynamic thermal management for multimedia applications", in Proceedings of the 17th Annual International Conference on Supercomputing (2003).

T. Thepmanee et al., "Waste-Heat Thermoelectric Power Source for Industrial Wireless Transmitters", in IEEE Conf. on Electrical Engineering/Electronics Computer Telecommunications and Information Technology (2010).

C.-J. Wu et al., "Architectural Thermal Energy Harvesting Opportunities for Sustainable Computing", Computer Architecture Letters, 13(2), pp. 65-68 (2013).

Y. Zhou et al., "Harvesting Wasted Heat in a Microprocessor Using Thermoelectric Generators: Modeling, Analysis and Measurement", in Proceedings of the Design, Automation and Test in Europe Conference (2008).

S. Lee et al., Hot Spot Cooling and Harvesting CPU Waste Heat Using Thermoelectric Modues, in Proceedings of the ASME 2014 International Mechanical Engineering Congress & Exposition (IMECE2014) (2014).

O.Sullivan et al., "On-Chip Power Generation Using Ultrathin Thermoelectric Generators", Journal of Electronic Packaging, vol. 137, pp. 011005-1-011005-07 (2015).

V. Semenyuk et al., "On-Chip Hot Spot Cooling: Forecasts and Reality", in Proceedings of the 6th European Conference on Thermoelectrics, pp. I-06-1-I-06-6 (2008).

"TECs and Mciro TECs for Spot Cooling Electronics", Downloaded from http://www.qats.com/Download/Qpedia_Dec10_TECs_and_MicroTECs_for_Spot_cooling_electronics.ashx on Aug. 6, 2014.

* cited by examiner

FIG. 18A
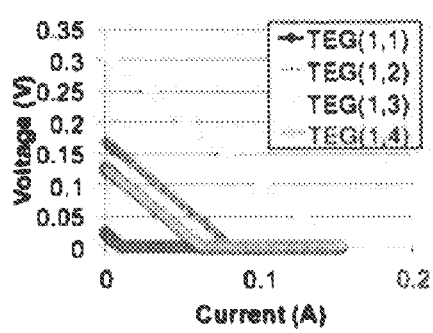
FIG. 18B
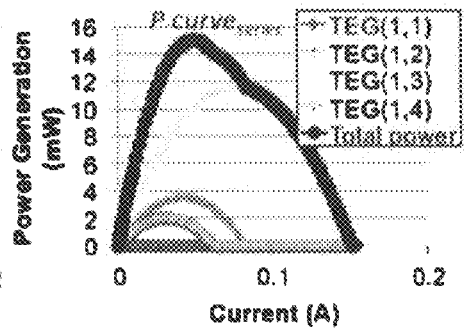
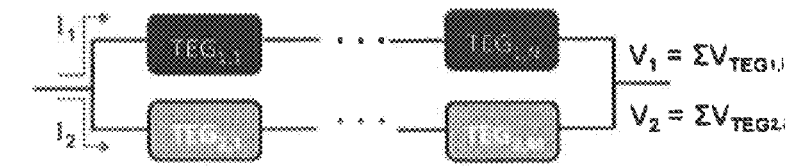
Rules of Thumb
- Current over the TEGs in the same subset should be as similar as possible
- Voltage over the subsets in parallel should be as similar as possible (V1 & V2)
- $V_{total}$ should be close to $V_{TEC}$ and $I_{total}$ should be close to $I_{TEC}$
FIG. 18C FIG. 19A
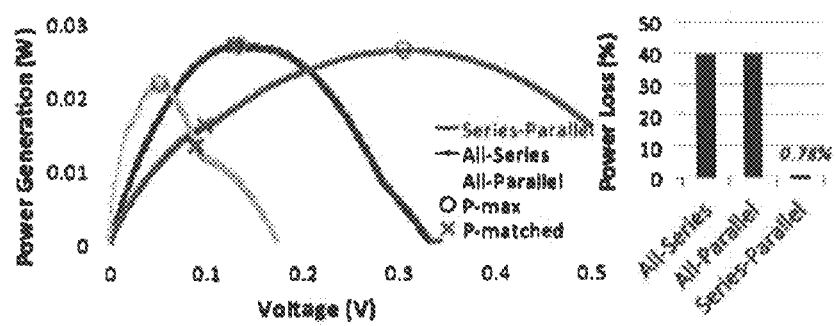
FIG. 19B      FIG. 19C

SYSTEMS AND METHODS FOR SUSTAINABLE SELF-COOLING OF CENTRAL PROCESSING UNIT THERMAL HOT SPOTS USING THERMOELECTRIC MATERIALS

CROSS REFERENCE TO RELATED APPLICATIONS

This is a non-provisional application that claims benefit to U.S. provisional application Ser. No. 62/048,364 filed on Sep. 10, 2014 and is herein incorporated by reference in its entirety.

GOVERNMENT SUPPORT

This invention was made with government support under contract 1358805 awarded by the National Science Foundation. The government has certain rights in the invention.

FIELD

The present document relates to a sustainable self-cooling framework for a central processing unit, and in particular to systems and methods for sustainable self-cooling of the thermal hot spots of a central processing unit using thermoelectric materials.

BACKGROUND

Power has been the stumbling block in the path to achieve continued performance growth for modern processor architectures. The fundamental challenge of the power issue is two-fold. First, for any computing system, a rapid increase in power dissipation results in thermal runaway—a vicious cycle where high power dissipation creates thermal hot spots; higher temperature leads to higher leakage power, which heightens power consumption, creating more thermal hot spots. Frequent thermal hot spots and high power dissipation not only degrade overall system energy efficiency but can also affect functional correctness of the hardware.

The second challenge is in the usage of energy itself, i.e., energy utilization efficiency. As we increase the power consumption, a large fraction of the actual energy is wasted in the form of heat. Removing wasted heat from the system requires more power for cooling, which further lowers overall energy efficiency, exacerbating the vicious cycle.

In order to address these challenges and ensure that all transistors can perform correct computations, it is important to implement proper temperature control and energy management techniques that reduce the risk of failure due to thermal hot spots. Prior approaches have proposed to aggressively remove the heat generated from computations by incorporating (1) active cooling mechanisms and/or, (2) applying effective dynamic thermal management techniques.

Active cooling mechanisms are commonly applied to quickly dissipate the heat generated on computing devices. Although common cooling techniques such as mechanical fans, heat spreaders, or liquid-based or oil-based cooling techniques, can effectively reduce the device temperature, they require extra energy to just remove the wasted heat energy. For example, using mechanical fans to cool down the temperature of the CPU requires significant space for the heat sink and fan installation, and it draws additional power to propel the fan.

In addition to devising effective cooling mechanisms to remove heat externally, modern processors are governed by a collection of dynamic thermal management (DTM) techniques to reduce thermal emergencies. In contrast to removing heat, DTM techniques avoid processor core overheating by slowing down heat generation. When processor cores are operating at a temperature higher than a pre-determined temperature that may cause a potential thermal hazard, the DTM governor throttles the core frequency. Since DTM techniques address the problem by avoiding it, the computation power of the processor is not maximally utilized. In other words, DTM-based solutions often work at the expense of performance.

In summary, both heat removal using conventional active cooling mechanisms and heat avoidance using DTM techniques are suboptimal solutions. This is because the chip temperature is often governed by a few hot spots on the chip. In order to ensure that the CPU operates under a certain temperature threshold, cooling mechanisms and/or DTM solutions have to be activated when any of the chip location reaches this threshold. This results in an overkill for the rest of the chip that is often much cooler than the hot spots. Alternatively, localized hot-spot cooling using miniature thermoelectric coolers has been investigated for processors; however, it requires additional electric power input.

The heat distribution of computing platforms offers an interesting opportunity for heat and energy optimization, both in the horizontal and vertical dimensions. Within a processor chip, the temperature difference between the hottest components, e.g., load-store queues (LSQ), arithmetic logic units, or power supply rails, and the coldest components, e.g., the I/O panel or the large last-level cache, can easily be more than 30° C. with the CPU's cooling fan turned on. FIG. 1 illustrates a heat map of an INTEL Core i5 3470 Processor captured on an infrared camera. The temperature of the hottest spot is at 85° C. whereas the cooler area of the processor is at 56° C. for this particular application example. Regardless of the processor architecture, the CPU hot spot characteristics, i.e., small concentrated hot spots versus large, sparse cooler areas remain similar. To exploit the thermal characteristics of a processor, the proposed framework leverages the thermoelectric effect by employing thermoelectric generators (TEGs) to generate electricity from a temperature difference and use the harvested energy to power thermoelectric coolers (TECs) to lower the temperature of hot spots. The thermoelectric effect is the phenomenon where a difference in temperature creates an electric voltage difference, and vice versa. When a voltage is applied to a thermoelectric material, the splitting and combination of electron hole pairs result in a temperature difference on the material, called the Peltier effect. Therefore, the thermoelectric material can be used as a cooler. Conversely, if the material is subjected to a difference in temperature, a voltage difference is created, called the Seebeck effect. We leverage the Seebeck effect to recover the otherwise wasted heat energy on a computing platform and transform it into electricity, and exploit the Peltier effect to lower the temperature of hot spots. FIG. 2 shows the basic element of generating electricity from a heat source using the Seebeck thermoelectric effect. A thermoelectric semiconductor material is mounted between two electrodes and generates a flow of electron (hole) current when the two ends of the device are subjected to a difference in temperature. In the case for FIG. 2, one p-type and one n-type semiconductor materials are connected in series to generate a larger thermoelectric current. Such a Seebeck thermoelectric device is called a TEG, with a typical construction shown in FIG. 3. A typical construction of the TEG contains many basic thermoelectric semiconductor elements connected in series to generate a larger voltage and current. As discussed earlier, when the module is supplied with a voltage difference, it creates a temperature difference and acts as a TEC.

The ability to generate electricity from a temperature differential was shown to be possible at a practical usage level in recent material science breakthroughs, such as the use of thermoelectric devices to power a wireless transmitter. Other developments have shown the use of thermoelectric materials to supply power to body-worn electronics and environmental sensors. The challenges faced in such application domains are (1) the fast-changing ambient conditions that directly introduce variations in the harvested energy, and (2) the small amount of voltage generated (around 50 uW at a voltage in the order of mV) because the temperature difference between the body and ambient for body-wearable applications is only 3 to 5° C. In addition, energy conversation efficiency of thermoelectric materials is still relatively low at about 30%. As such, further improvements in providing a sustainable self-cooling of CPU thermal hot spots using thermoelectric materials is desired.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 18A is a graph showing the corresponding voltages of the individual thermoelectric generators by sweeping a range of different current values;

FIG. 18B is a graph showing the corresponding per-thermoelectric generator power generation given a current value as well as the total power generation for an all-series connection;

FIG. 18C is a simplified illustration showing the electrical connection of all the thermoelectric generators using a series/parallel combination;

FIG. 19A is a simplified illustration showing the electrical connections for the thermoelectric generators and thermoelectric coolers;

FIG. 19B is a graph showing $P_{max}$ and $P_{matched}$ comparison for the three electrical connections for series-parallel, all-series, all-parallel electrical connections; and FIG. 19C is a graph showing power loss percentage for all-series, all-parallel and series-parallel electrical connections.

Corresponding reference characters indicate corresponding elements among the view of the drawings. The headings used in the figures do not limit the scope of the claims.

DETAILED DESCRIPTION

Figure 1:
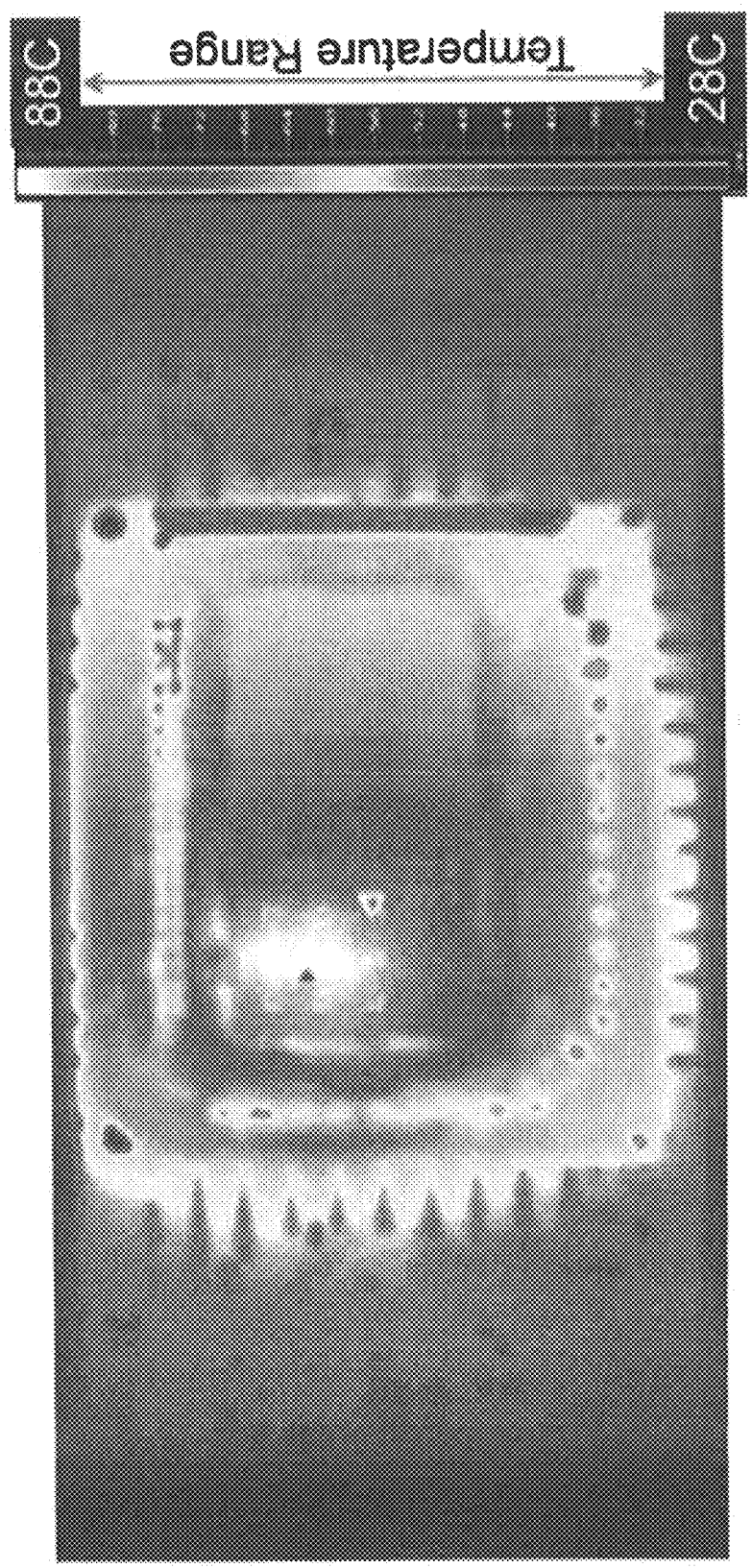
FIG. 1 is an infrared color image showing a processor running an application on core 0.
Figure 2:
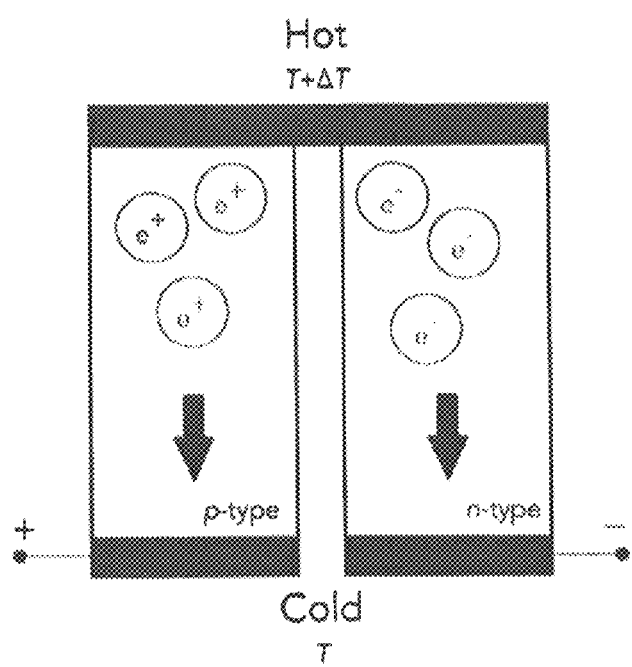
FIG. 2 is a simplified illustration showing the Seebeck effect.
Figure 3:
FIG. 3 is a picture showing a typical thermoelectric generator of the prior art.

Embodiments of a sustainable self-cooling framework (SCOOL) using thermoelectric generators (TEG) to power an arrangement of thermoelectric coolers (TEC) to cool thermal hot spots generated by a processor are disclosed herein. In the sustainable self-cooling framework, thermoelectric generators are used to harvest Central Processing Unit (CPU) waste heat from the functional units of the CPU operating at a relatively lower temperature to sustain the power requirement TEC-based spot cooling on the hot spots of a processor.

Embodiments of a sustainable self-cooling framework, designated 100, are shown in FIGS. 1, 2 and 4-19. FIG. 4A depicts the architecture of sustainable self-cooling framework 100. The sustainable self-cooling framework 100 includes an additional layer between the heat spreader 108 and the heat sink 106 of the processor in the default baseline scheme is used to harvest CPU 112 waste heat for spot cooling. To coordinate the placement of thermoelectric generators 102 and thermoelectric coolers 104 in the proposed layer, the design is based on the floor plan of an Alpha EV6 21264 processor. FIG. 4B illustrates the temperature map of the Alpha processor running cactusADM at 2 GHz. The temperature of the hot spots, e.g., integer and floating point map, are 65° C. and 57° C., respectively, whereas the temperature of the cooler areas, e.g., the L2 cache, is 31° C. Across all SPEC2006 CPU 112 benchmarks under study (including both compute- and memory-intensive applications), hot spots generally occur at the integer and floating-point map (Int. Map and FP Map in FIG. 4), whereas the L1 and L2 caches often run at a much lower temperature. Based on this temperature distribution characteristic, the placement of TEG 102 and TEC 104 modules in sustainable self-cooling framework 100 is designed over the baseline processor. FIG. 4B further shows an example of TEG 102 and TEC 104 module placement for cactusADM, a compute-intensive SPEC2006 CPU 112 application. For this application, hot spots occur at Int. Map and FP Map—the spot cooling targets. On the other hand, the data TLB, instruction and data caches, the L2 cache, as well as the peripheral area of the heat spreader 110 run at a relatively cooler temperature. Therefore, these blocks are placed with TEGs 102 for waste heat harvesting. Finally, for the functional blocks that run at the temperature range between the hot spots and the cooler area, heat sink 106 materials are applied such that no waste heat will be harvested from these areas.

Assuming that the amount of power generation provided by the TEG 102 modules entirely to power the TEC 104 modules for hot spot cooling, the relationship between the power generation of the thermoelectric generator 102 and power requirement of the thermoelectric cooler 104 can be expressed as:

$$P_{TEG,generation} \geq P_{TEC,requirement} \quad (1)$$

The most important constraints sustainable self-cooling framework 100 enforces are $$\dot{T}_{cool} \leq T_{hotspots} \quad (2)$$

and $$\dot{T}_{hotspots} \leq T_{hotspots} \quad (3)$$

where $\dot{T}_{cool}$ is the temperature of the cool area after thermoelectric generator 102 application, $\dot{T}_{hotspots}$ is the temperature of the hot spots after the thermoelectric cooler 104 application as shown in FIG. 4B, and $T_{hotspots}$ is the temperature of the hot spots in the default baseline.

Since applying thermoelectric generator 102 increases the thermal resistance and thus increases the temperature of a functional unit, the first step is to identify the functional units with the placement of the thermoelectric cooler 104 that satisfies Equation 2. After this step, a list of functional units for thermoelectric generator 102 waste heat harvesting is generated. The next step is to calculate the total power generation of the TEG 102 modules, $P_{TEG,generation}$, on those functional units. $P_{TEG,generation}$ is then used to power the TEC modules 110 for spot cooling and is evaluated to see how much it can reduce the temperature of the hot spots. For the rest of the functional units (which are neither in the list of thermoelectric generator 102 placement nor CPU 112 hot spots), neither the TEG 102 modules nor the TEC 104 modules are placed. Instead, additional heat sink 106 materials will be used to allow good heat conductivity between these units and the heat sink 106 in the default baseline design.

If $\dot{T}_{hotspots}$ becomes lower than the temperature of other functional units, the TEG 102/TEC 104 placement identification process is repeated until the temperature of all functional units in the sustainable self-cooling framework 100 is below $\dot{T}_{hotspots}$.

Electrical Connection and Load Matching

To deliver the maximum power generation from the TEGs 102 to the TECs 104 for spot cooling, the electrical connection of the TEGs 102 and the intermediate circuit 108 connecting the TEGs 102 and the TECs 104 need to be carefully designed to minimize potential power loss. For the TEGs 102, naive serial and parallel connection approaches are explored and compared with the proposed optimal series-parallel configuration. On the TEC 104 side, the target temperature reduction sets the threshold voltage and current required for activating the TEC 104. The target temperature reduction also sets the load that is equivalent to the ratio of voltage and current required for the TEC 104. If the TEG 102 load is matched to the specific TEC 104 load value given a hot-side temperature, the amount of the cooling provided by the TEC 104 may be determined.

Electrical Connection Between the TEGs

Figure 8:
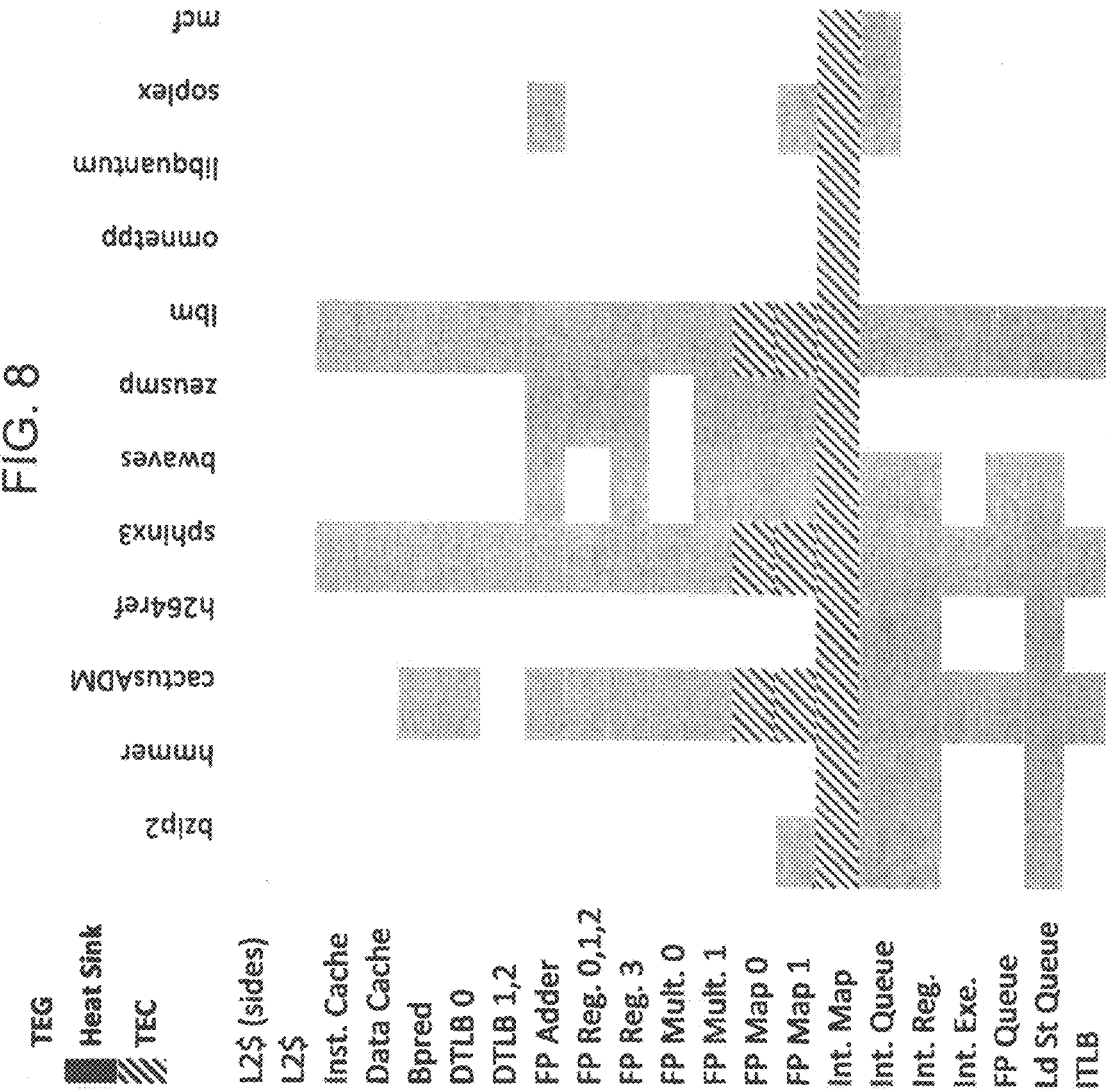
FIG. 8 illustrates one arrangement for the placement of thermoelectric generators, thermoelectric coolers, and heat sink blocks.

As shown in FIG. 8, twelve variable-sized TEGs 102 are deployed over specific functional units for cactusADM. A naive approach to connect the TEGs 102 together is to connect all TEGs 102 in series (All-Series) or connect all TEGs 102 in parallel (All-Parallel). The All-Series combination maximizes the total voltage while the All-Parallel combination maximizes the total current. While the design is simple, the power loss could be high for such naive approaches. This is because the temperature difference across each individual TEG 102 depends on the temperature of the specific functional unit, and, in turn, causes different output voltage and current values. The mismatch in current from the different TEGs 102 causes power loss in the All-Series combination while the mismatch in voltage from the different TEGs 102 causes power loss in the All-Parallel combination.

To quantify the degree of power loss in the All-Series and the All-Parallel combinations, we perform a current and voltage sweep. FIGS. 18A and 18B show the current/voltage sweep methodology to identify the power generation for a group of TEGs 102 connected in a specific manner. For illustration purpose, we use an example of the All-Series connection for a subset of the four TEGs 102 electrically connected in series. As shown in FIG. 18A, the corresponding voltages of the individual TEGs 102 are obtained by sweeping a range of different current values since the current flowing through all serially-connected TEGs 102 is identical. FIG. 18B shows the corresponding per-TEG 102 power generation given a current value as well as the total power generation for the All-Series connection. The peak of the black curve indicates the maximum power generation for this example. A similar methodology is applied to identify the total power generation for All-Parallel by performing a voltage sweep.

To minimize the power loss caused by the temperature mismatch of the TEGs 102, the electrical connection of all the TEGs 102 uses a Series-Parallel combination as illustrated in FIG. 18C. The following rule of thumb is used to minimize the voltage and current mismatch from the TEGs 102. A subset of TEGs 102 is selected to be connected in series to boost up the voltage and divide the rest of the TEGs 102 to subsets within which the TEGs 102 are connected in series to generate a similar voltage target. For the TEGs 102 in the same subset, the output current should be as similar as possible to minimize current mismatch. Then the different TEG 102 subsets are connected in parallel to boost up the total current. The electrical connection between the TEGs 102 is designed to suit the operational range for the TEC 104. For this specific two-group structure, the best grouping of TEGs 102 were exhaustively searched in order to maximize power generation individually for each benchmark. The optimal connection that resulted in maximum power for all twelve benchmarks turned out to be identical due to the similar amount of power generated by L2 cache, $RestArea_0$ and $RestArea_1$ units.

To quantitatively evaluate the power generation in the three approaches—All-Series, All-Parallel, and Series-Parallel combinations, we use cactusADM as an example. FIG. 19A illustrates the electrical connection for the TEGs 102 and the TECs 104. Given the TEGs 102, the current of the TEGs 102 connected in series in the subsets is swept and the voltage of the subsets connected in parallel as described previously is also swept. For each swept voltage value, the current of the TEG 102 subsets sum up to the total current. As the voltage increases, note that the total TEG 102 current monotonically decreases. Therefore, we can identify the maximum power point, which we denote as $P_{max}$ in FIG. 19B for the three different types of electrical connection between the TEGs 102—All-Series, All-Parallel, and Series-Parallel.

Load Matching Between TEGs and TECs

As described earlier, the load characteristics of the TEC 104 is determined by the target temperature reduction and the geometric options. Among all pairs of the voltage (V) and current (I) values depicted by the curve in FIG. 19B, there is one and only one pair of V/I values that satisfies the particular TEC 104 load due to the mono-tonicity of V and I. The power of this specific V/I would be the power generation of the TEG 102 modules when the TEG 102 modules and the TEC 104 modules are interconnected directly. This power is denoted as $P_{matched}$ and illustrate them for the three connections in FIG. 19B.

While $P_{max}$ of the naive All-Series connection is close to $P_{max}$ of the customized Series-Parallel design for cactusADM, $P_{matched}$ of the naive All-Series and All-Parallel connections deviate from their $P_{matched}$ points significantly. This suggests that the naive connections of the TEGs 102 would incur significant power loss when the TEC 104 load is directly applied, 39.5% and 39.6% for All-Series and All-Parallel, respectively. This power loss can be reduced substantially with the customized connection, resulting in a negligible power loss of 0.78% as illustrated in FIG. 19C.

The amount of deviation in $P_{matched}$ of the Series-Parallel design is measured compared to the ideal $P_{max}$ across all 12 benchmarks under study—soplex has the highest deviation of 6% while the average deviation is 3%. With such low deviation across all benchmarks, we propose to directly connect the TEGs 102 to the TECs 104, where close-to-maximum power is delivered from the optimally-configured TEGs 102 to the TECs 104 for spot cooling.

Circuit Design Alternatives

In case the specific electrical connection of TEGs 102 leads to a considerably low $P_{matched}$ compared to $P_{max}$ (e.g., the All-Series configuration in our application), introducing a high-efficiency DC-DC converter or voltage regulator between the TEGs 102 and the TECs 104 would be beneficial. The DC-DC converter could down-convert or up-convert the voltage that maximizes power generation for the specific configuration of TEGs 102 to a voltage (and current) that matches the TEC 104 load. For the All-Series TEG 102 configuration for cactusADM, if a voltage converter that supports low input and output voltages could convert 310 mV to 120 mV with 90% efficiency, the power generation conveyed to the TECs 104 increases from 15.8 mW to 23.5 mW (1.5×).

Figure 4C:
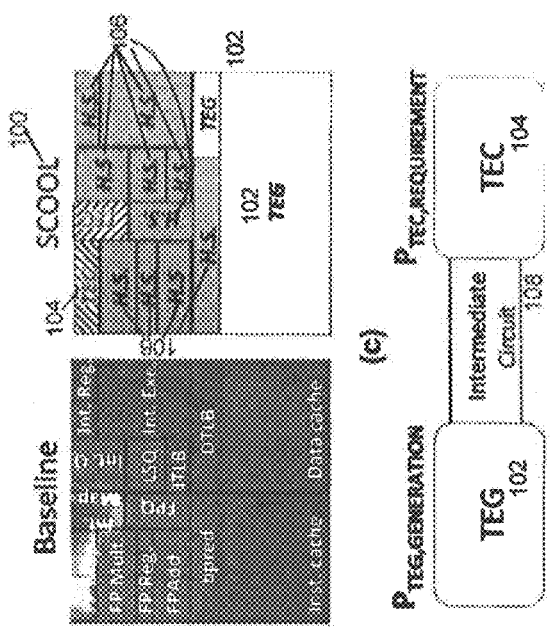
FIGS. 4A-4C illustrate various aspects of a sustainable self-cooling framework.
Figure 4B:
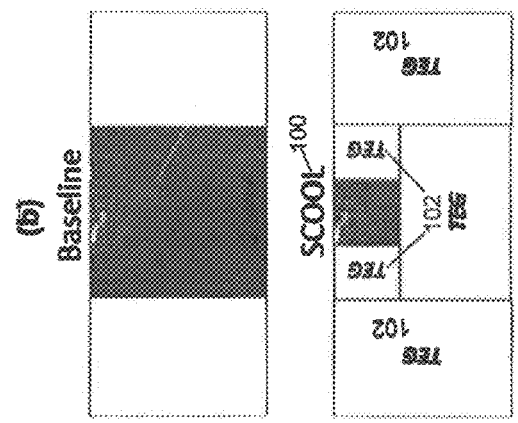
Figure 4A:
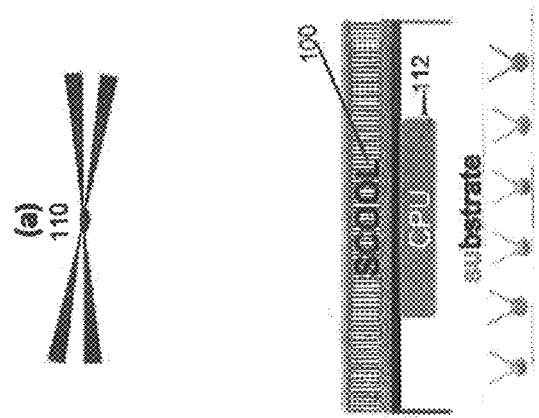

To deliver the power generation of the TEGs 102 to TECs 104 for spot cooling, an intermediate circuit 108 needs to be carefully designed (FIG. 4C). In order to maximize the power generation of multiple TEG 102 modules connected in series or a customized TEG 102 module for a specific configuration, a matching load with a similar resistive value as the internal resistance of the TEG 102 should be provided. Other regulating circuits may be required to provide required voltage and current settings for the TECs 104 for spot cooling. It is assumed that a matching load is achieved in the intermediate circuit 108 connecting the TEG 102 modules and TEC 104 modules.

Figures 5A, 5B:
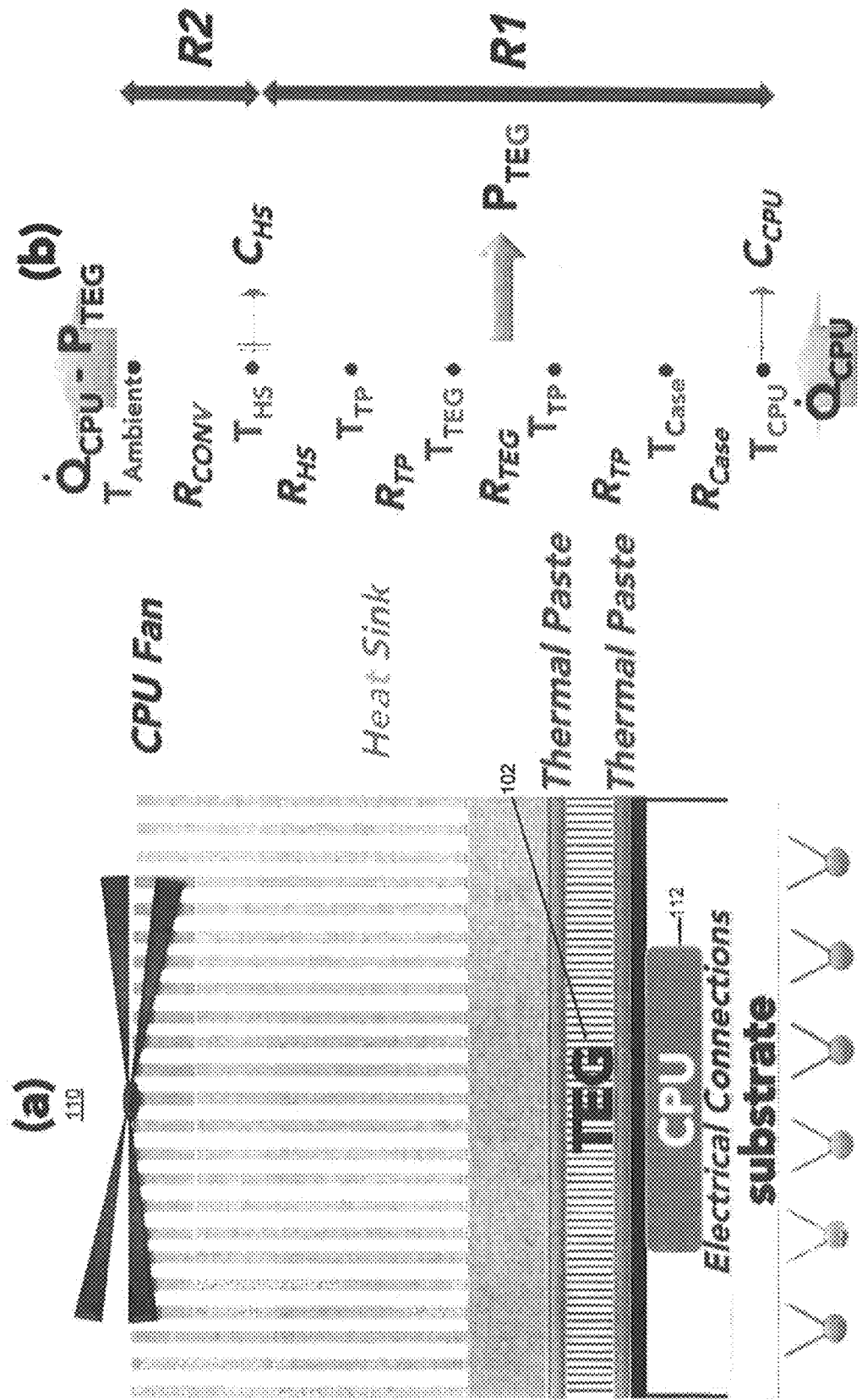
FIG. 5A illustrates an architecture of a thermoelectric model analysis.
FIG. 5B illustrates the corresponding thermal analysis for the layers of the sustainable self-cooling framework shown in FIG. 5A.

In order to understand the potential and the limitation of the sustainable self-cooling framework 100, a thermal analysis model was developed to study the heat transfer for the baseline and the sustainable self-cooling framework 100, as shown in FIG. 5A. The analytical model offers a theoretical solution for the amount of recovered energy from the CPU 112 waste heat and examines whether it is sufficient to sustain CPU 112 spot cooling.

In this theoretical analysis, a two-node thermal network is chosen because it is a simple and accurate approach for analyzing the steady state and transient behavior of thermal systems. The first step in a two-node thermal network analysis of the TEG-based CPU 112 in electronic packaging is to determine the thermal capacitance and thermal resistance of all components including the CPU 112, the thermal interface (thermal paste), the TEG 102, and the active cooling system (the heat sink and mechanical fan). These can be derived using Equations 4 and 5 with geometry depicted in FIG. 5A.

$$C = C_p * m \quad (4)$$

where C is the thermal capacitance, $C_p$ the specific heat, and m the mass. The thermal resistance R is given by $$R = L/kA \quad (5)$$

where k is the thermal conductivity, L is the layer thickness, and A is the cross-sectional area.

To determine the rate of 112 heat input to the system, $Q_{CPU}$ the hardware performance monitoring counter is used to measure the temperature of the CPU 112. Equation 6 shows the formula that calculates the CPU 112 heat input rate based on the CPU 112 and ambient temperatures.

$$Q_{CPU} = T_{CPU} - T_{ambient}/R_{tot} \quad (6)$$

Figure 6:
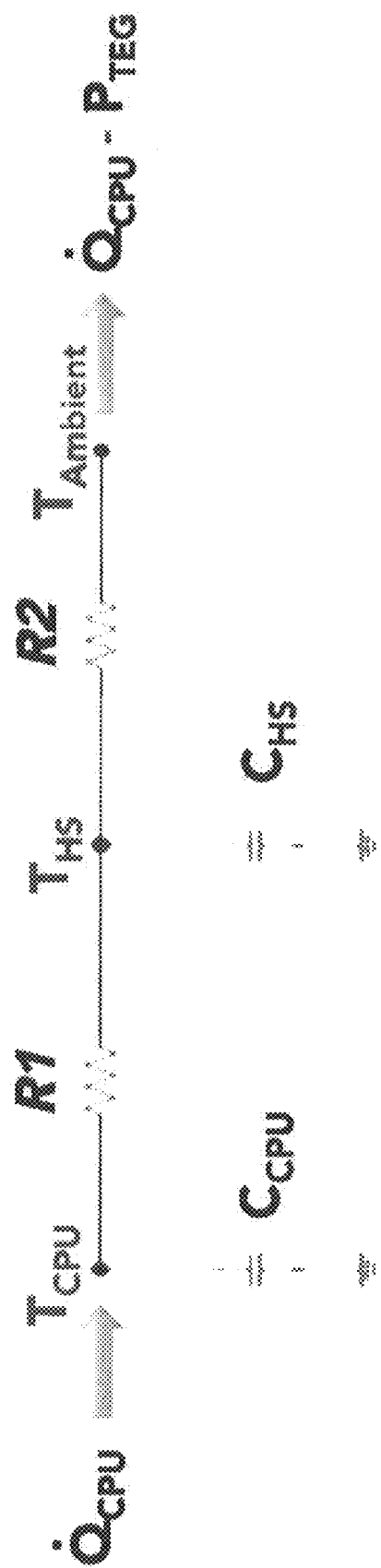
FIG. 6 illustrates a two-node network model.

Next, in order to obtain the temperature of the CPU 112, the resistance R1 and R2 in FIG. 6 is calculated as $$R1 = R_{Case} + R_{TP} + R_{TEG} + R_{TP}; \quad R2 = R_{HS} + R_{CONV} \quad (7)$$

The heat flows for each node are defined in Equations 8 and 9.

$$Q_{CPU} = C_{CPU} * dT_{CPU}/dt + T_{CPU} - T_{AMBIENT}/R_1 \quad (8)$$

$$0 = C_{HS} * dT_{HS}/dt + T_{HS} - T_{AMBIENT}/R_2 \quad (9)$$

The solution of Equations 8 and 9 represents the CPU temperature by using homogeneous and particular solutions as $$T_{CPU} = a_1 * \exp* -1/R1 * C_{CPU} + a_2 * \exp* -1/R_2 * C_{HS} + T_{Ambient} + R_1 * Q_{CPU} \quad (10)$$

The coefficients, $a_1$ and $a_2$, are determined by using the following initial conditions: 30° C. for $T_{CPU}$ and 0° C./s for $dT_{CPU}/s$ at the initial time.

Finally, the temperature of each layer depicted in FIG. 5A is determined by solving Equations 6-10 and use the temperature of $T_{Case}$ and $T_{HS}$ to represent the temperature of the hot and the cold sides of the TEG 102 module, which is used to derive the electric power generation of the TEG 102:

$$P_{TEG} = I^2 * r = (N * \alpha * DT)^2/4 * r_{TEG} \quad (11)$$

where I is the current, $r_{TEG}$, the electric resistance of the TEG 102, N the number of P/N leg pairs, α the Seebeck coefficient, and ΔT the temperature difference between the hot and cold sides of the TEG 102.

In order to evaluate the amount of energy required to power the TEC 104 modules for CPU 112 hot spot cooling, we use the TEC model as follows:

$$P_{TEC} = 2 * N * G * k * Z * T_C * T_H \quad (12)$$

Where N is the number of P/N leg pairs, G is the geometric factor (G is equal to the cross-sectional area over thickness), k is the thermal conductivity, Z is the figure of merit (material efficiency), $T_c$ the cold-side temperature of the TEC, and $T_H$ the hot-side temperature of the TEC 104.

In order to validate the developed model for understanding the temperature effect introduced by the additional TEG 102 layer in FIG. 5A, the design was built on a modern desktop platform which houses an Intel Quad-Core Ivy-Bridge (IVB) processor (Intel Core i5 3470). The temperature of the CPU 112 is collected empirically using the hardware performance monitoring counters as well as using k-type thermocouples.

Figure 7:
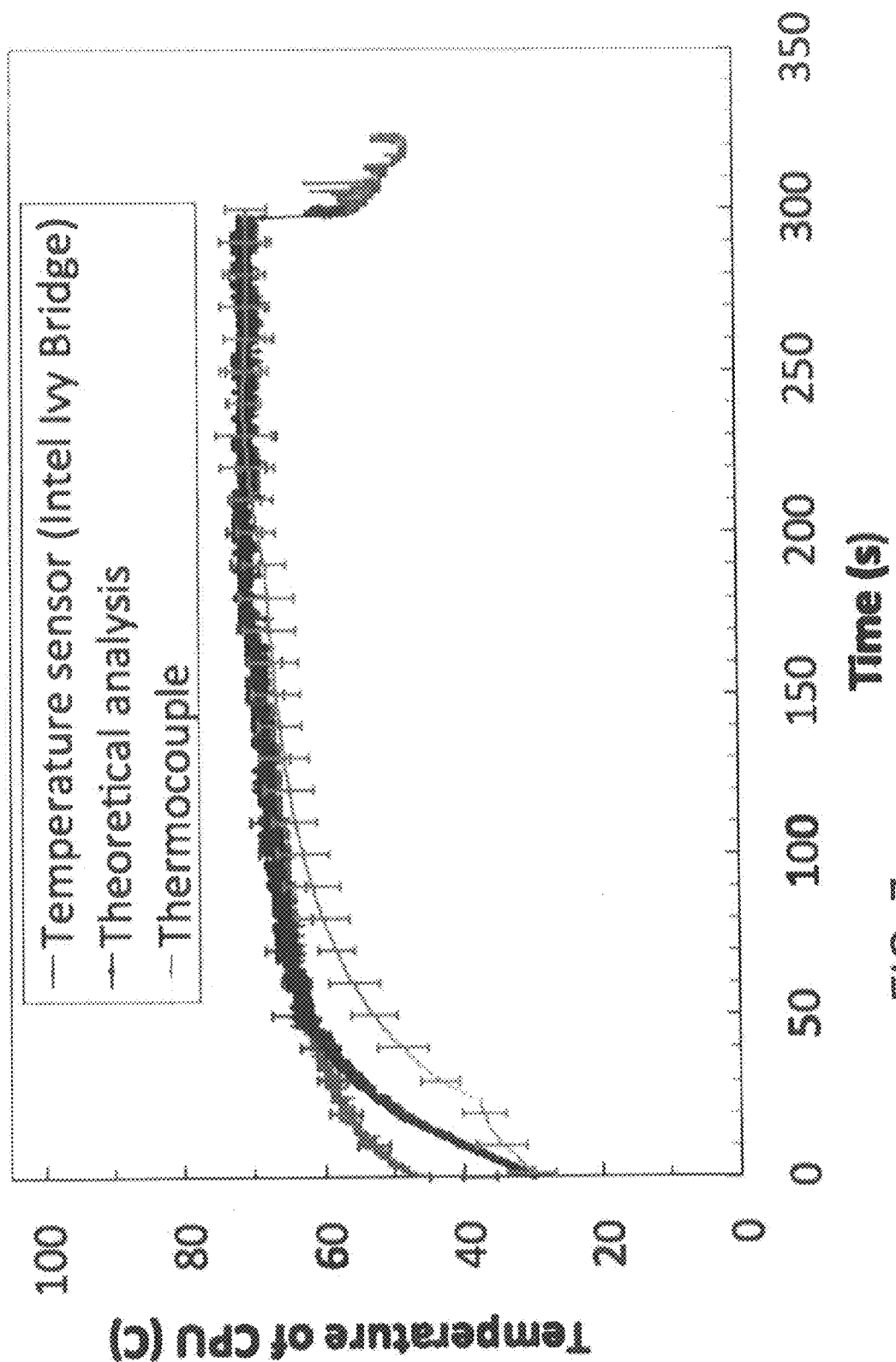
FIG. 7 is a graph illustrating a comparison of CPU temperatures obtained during testing of the sustainable self-cooling framework.

The CPU 112 temperature derived from our model (Equation 10) is accurate and is in agreement with the experimentally-obtained temperature using both thermocouples and performance counters. FIG. 7 compares the CPU 112 temperatures obtained from our model, with thermocouples and with performance counters when bzip2 is executing on the processor. In steady state, the CPU 112 temperatures are closely tracked by the three different approaches. In the initial execution phase, there is a larger difference between the different approaches. It is believed that the temperature difference between the counter-based thermal trace and the thermocouple measurement is due to the stored heat energy (heat capacitance) in the CPU 112 since the temperature trace is collected by directly reading the digital thermal sensors whereas the thermocouple is located on the CPU 112 case. In addition, the difference between the analytical CPU 112 temperature and the measured data can come from the fact that the model does not consider the horizontal heat dissipation. Thus, the analytical results can be higher than the measured results.

The activity traces are collected for applications in the SPEC2006 CPU 112 Benchmark Suite using a full-system multicore simulator, gem5. The parameters of the simulated processor are described in Table 1. SimPoints methodology is used to identify representative program regions of 250-million instructions for each SPEC2006 applications and collect the activity traces using gem5. The activity traces are fed to Mc-PAT to obtain power traces for an Alpha processor for the SPEC2006 CPU applications. Finally, to obtain the temperature results for the target processor, a HotSpot version 5.02 is used to model the temperature distribution of the baseline processor and the processor with the sustainable self-cooling framework 100.

TABLE 1

Processor configurations

| | Parameters |
|---|---|
| Alpha EV6 21264 | 4-way out-of-order<br>256-entry integer register file<br>256-entry floating point register file<br>128-entry reorder buffer<br>4096-entry BTB<br>Tournament branch predictor with 8 KB global and 2 KB local predictor<br>64-entry/64-entry load/store queue |
| ITLB | 1024 entries; 2-way set-assoc.; 2 cycles |
| DTLB | 1024 entries; 2-way set-assoc.; 2 cycles |
| L1 Data Cache | 64 KB; 2-way set-assoc.; 1 cycle |
| L1 Inst Cache | 64 KB; 2-way set-assoc.; 1 cycle |
| Unified L2 Cache | 1 MB; 16-way set-assoc.; 15 cycles |
| Memory (DDR3) | 60-300 cycles |

To model the effects of TEGs 102 and TECs 104 and evaluate the effectiveness of the sustainable self-cooling framework 100, the developed TEG 102-based model as well as the TEC 102-based spot cooling technique is integrated into HotSpot, a widely-used and well-validated temperature modeling tool. Block-level simulation experiments were run for the sustainable self-cooling framework 100 using HotSpot.

The following parameter values are used for each individual layers in the baseline architecture and simulate an ambient temperature of 27° C. The heat sink 106 used in the HotSpot model for the baseline and the sustainable self-cooling framework 100 architecture is made of aluminum alloy, which is a state-of-the-art heat sink 106 metal also used in a modern desktop computer, such as Dell OptiPlex. The convection resistance of the finned shape heat sink 106 is 0.033 K/W and the convection capacitance of the heat sink 106 is 450 J/K. Other parameters used in the model are the default values provided by HotSpot. Table 2 lists the relevant parameter values.

TABLE 2

Parameters for the layers in the baseline [31]

| | Thermal Conductivity<br>W/m-K | Specific Heat<br>J/m³-K |
|---|---|---|
| Heat sink | 166 | 2.40 * 10⁶ |
| TIM | 4.0 | 4.00 * 10⁶ |
| Heat spreader | 400 | 3.55 * 10⁶ |
| Silicon die | 100 | 1.75 * 10⁶ |

In the model analysis and HotSpot simulation experiments, realistic physical parameters are used for TEGs 102 and TECs 104. The TEG 102 modules are based on Bismuth Telluride compounds (Bi2Te3) and the TEC 104 modules are based on (Bi2Te3/Sb2Te3). Table 3 presents the values of TEGs 102 and TECs 104 in the model.

TABLE 3

TEG/TEC module configurations

| | Height<br>mm | Specific Heat<br>J/m³-K | Thermal Conductivity<br>W/m-K | Seebeck Coefficient<br>uV/K |
|---|---|---|---|---|
| TEG/ceramic | 2.0 | 2.07 * e⁶ | 4.6879 | 677 |
| TEC | 2.0 | 1.154 * e⁶ | 17.0 | 301 |

In the model analysis and HotSpot simulation experiments, realistic physical parameters for TEGs 102 and TECs 104 were used. The TEG 102 modules are based on Bismuth Telluride compounds (Bi2Te3) and the TEC modules are based on (Bi2Te3/Sb2Te3). Table 3 presents the values of TEGs and TECs 102 in the model.

With the design rules described above, the locations of the TEG 102, TEC 104, and additional heat sink 106 material placement of the sustainable self-cooling framework 100 at the granularity of functional units. FIG. 8 shows the arrangement optimized for SPEC2006 applications individually. The vertical axis represents the functional units in the baseline architecture whereas the horizontal axis represents the SPEC2006 applications under study. The green blocks represent the functional units that are layered with TEG 102 modules, gray blocks represent the functional units that are layered with additional heat sink 106 materials, and the diagonal-striped blocks represent the functional units layered with TEC 104 modules. In addition to evaluating the sustainable self-cooling framework 100 optimized for each SPEC2006 applications, we also show results for a single, fixed TEG 102/TEC 104 placement.

The amount of power generation by the TEGs 102 placed on the default baseline processor was first investigated and the corresponding temperature cooling capability of the TECs 104 placed on hot spots. Then, the impact of the sustainable self-cooling framework 100 on the overall chip temperature was evaluated. In order to understand how the sustainable self-cooling framework 100 works in detail, cactusADM as an application example was used. The reliability and leakage power consumption impact brought by the sustainable self-cooling framework 100 was also evaluated. Finally, design optimization, TEG 102/TEC 104 parameter sensitivity and projection for future technology advancement are discussed.

Figure 9:
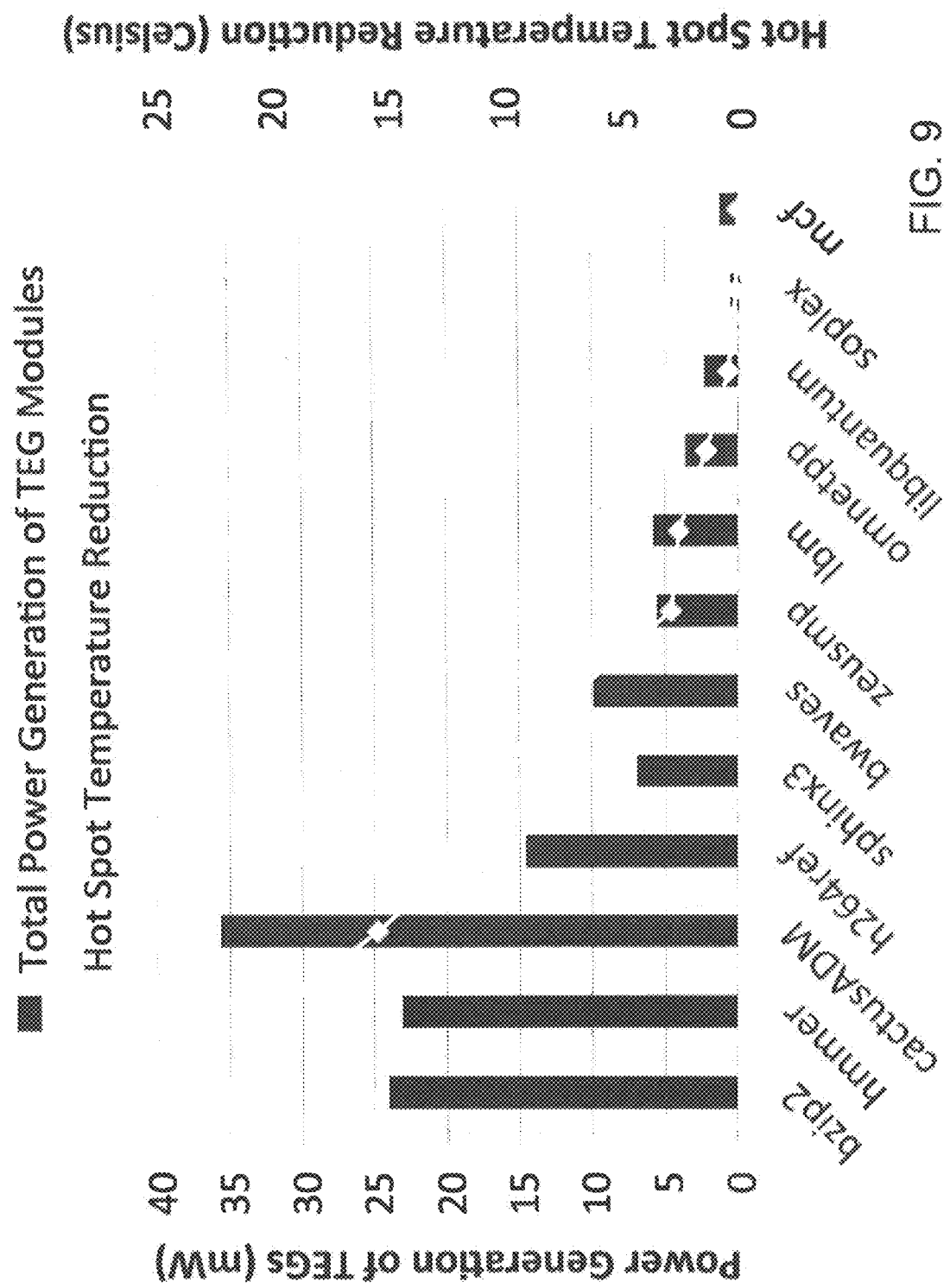
FIG. 9 is a graph illustrating the amount of power generation and corresponding hot spot temperature reduction for a particular application.

With the power generation of the TEG 102 modules, the sustainable self-cooling framework 100 can effectively reduce the temperature of hot spots by as much as 21.03° C. and by an average of 7.7° C. FIG. 9 shows the amount of TEG 102 power generation and the corresponding hot spot temperature reduction for the SPEC2006 applications. The left y-axis shows the power generation of TEGs 102 in mW and the right y-axis shows the temperature reduction of hot spots in celsius while the x-axis shows the SPEC2006 applications in the order of hot spot temperature reduction (high to low). In general, the sustainable self-cooling framework 100 reduces the hot spot temperature for compute-intensive applications (e.g., bzip2, hmmer, cactusADM) more significantly than for memory-intensive applications (e.g., libquantum, soplex, mcf). This is because the temperature difference between the hot spots and the cooler chip area for compute-intensive applications is much higher than that of memory-intensive applications.

Figure 10:
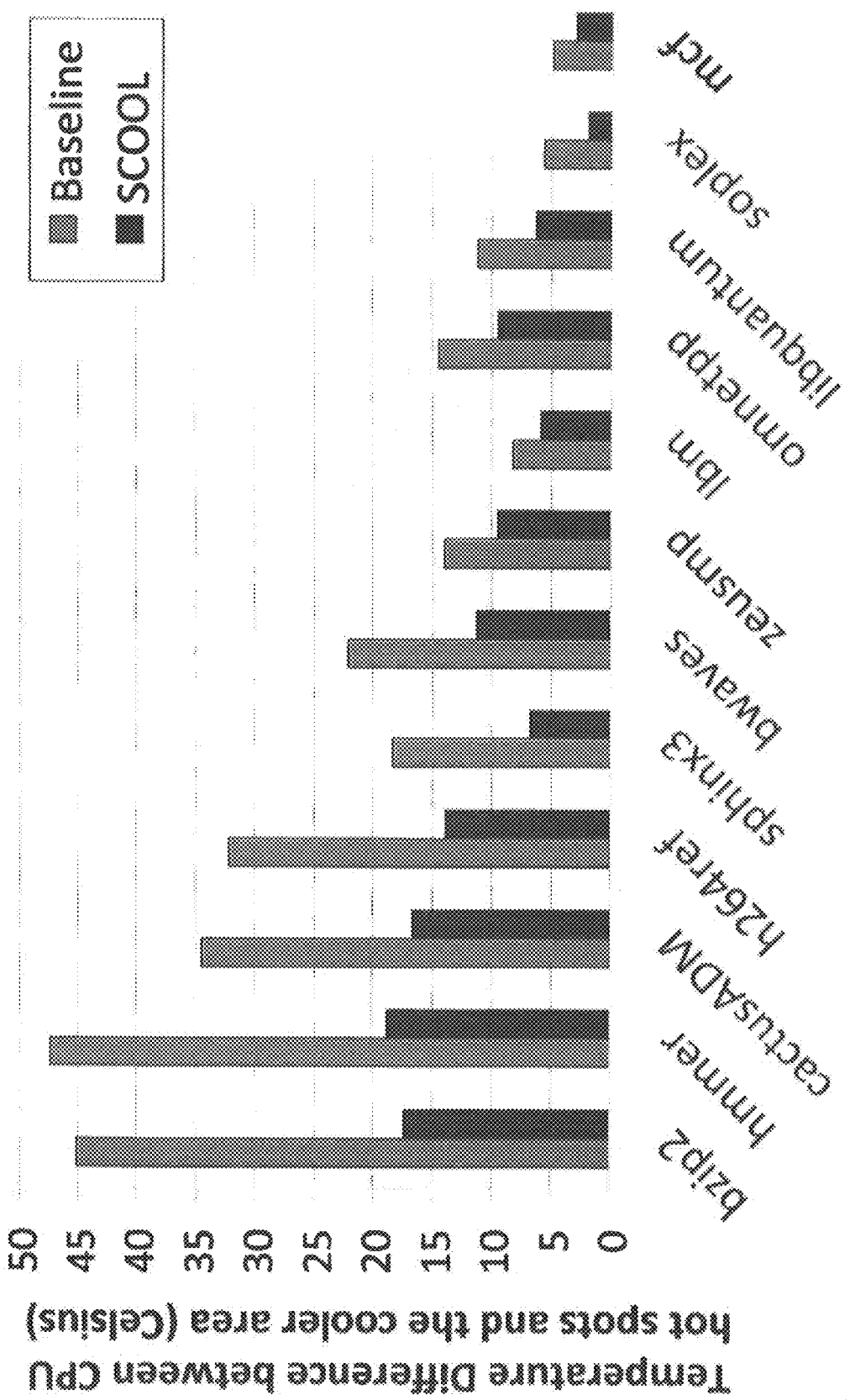
FIG. 10 is a graph illustrating the temperature difference between the CPU hot spot and the cooler area under the baseline and under the sustainable self-cooling framework.
Figure 11:
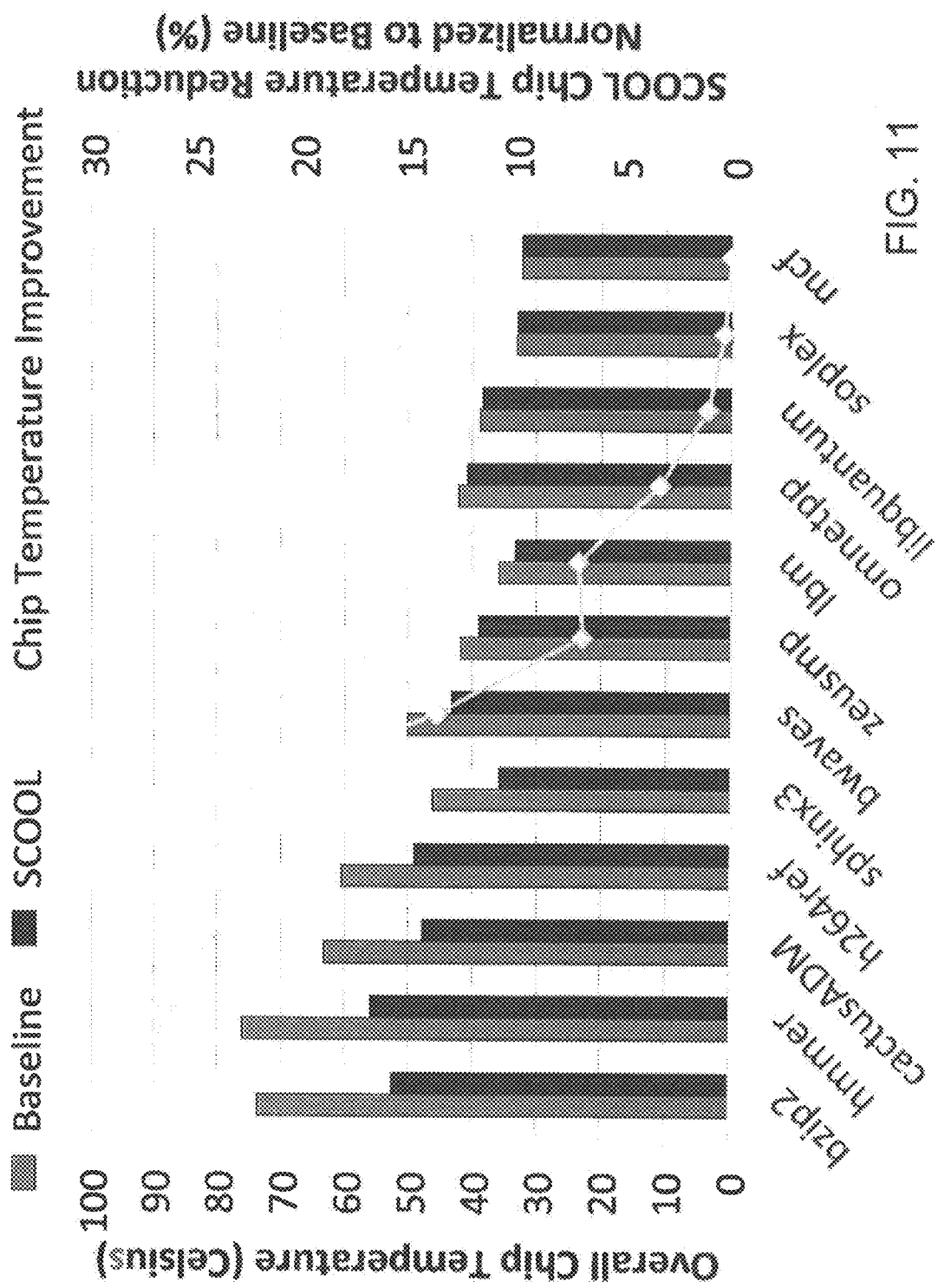
FIG. 11 is a graph illustrating the comparison of the overall CPU temperature under the baseline and under the sustainable self-cooling framework.

FIG. 10 shows the temperature difference between the CPU 112 hot spots and the cooler areas under the baseline and under the sustainable self-cooling framework 100. In the baseline design, the difference between the maximum and the minimum functional unit temperature for compute-intensive applications is as high as 47.35° C. (hmmer) whereas the temperature difference for memory-intensive applications is only between 5° C. to 15° C. When the temperature difference is large, there is more opportunity for CPU 112 waste heat harvesting with TEGs 102 because the sustainable self-cooling framework 100 has more freedom for TEG 102 placement while keeping the temperature after TEG 102 placement to be below the temperature of the hot spots. As a result of the sustainable self-cooling framework 100, the temperature difference between the functional units causing the maximum and minimum chip temperature is significantly reduced. This is because the temperature of the cooler area is increased after TEG 102 placement and the temperature of the hot spots is reduced after TEC 104 placement. Overall, the chip temperature under the sustainable self-cooling framework 100 is significantly lower than that under the baseline design. FIG. 11 shows the overall chip temperature that is constrained by the CPU 112 hot spot(s) under the baseline (orange bars) and under the sustainable self-cooling framework 100 (black bars) and the temperature improvement under sustainable self-cooling framework 100 when compared to the baseline (diamond dots). All SPEC2006 applications except for mcf observe reduced chip temperatures ranging from 21.03° C. for bzip2 to 0.11° C. for soplex. This translates to as much as 28.57% (and an average of 12.77%) temperature improvement under the sustainable self-cooling framework design 100.

To study the temperature implication brought by the sustainable self-cooling framework 100 in depth, cactusADM, a compute-intensive application was used, as an example. Among all applications under study, cactusADM benefits from the sustainable self-cooling framework's 100 hot spot cooling significantly. While it is not the application that shows the most temperature reduction under the sustainable self-cooling framework, it is an application that benefits from cooling at more CPU 112 locations. As FIG. 8 shows, the significant power generation of the TEG 102 modules allows the sustainable self-cooling framework 100 to cool the temperature of three individual functional units, i.e., the floating-point instruction schedulers (FP Map 0 and FP Map 1) and the integer instruction scheduler (Int. Map).

Figure 12:
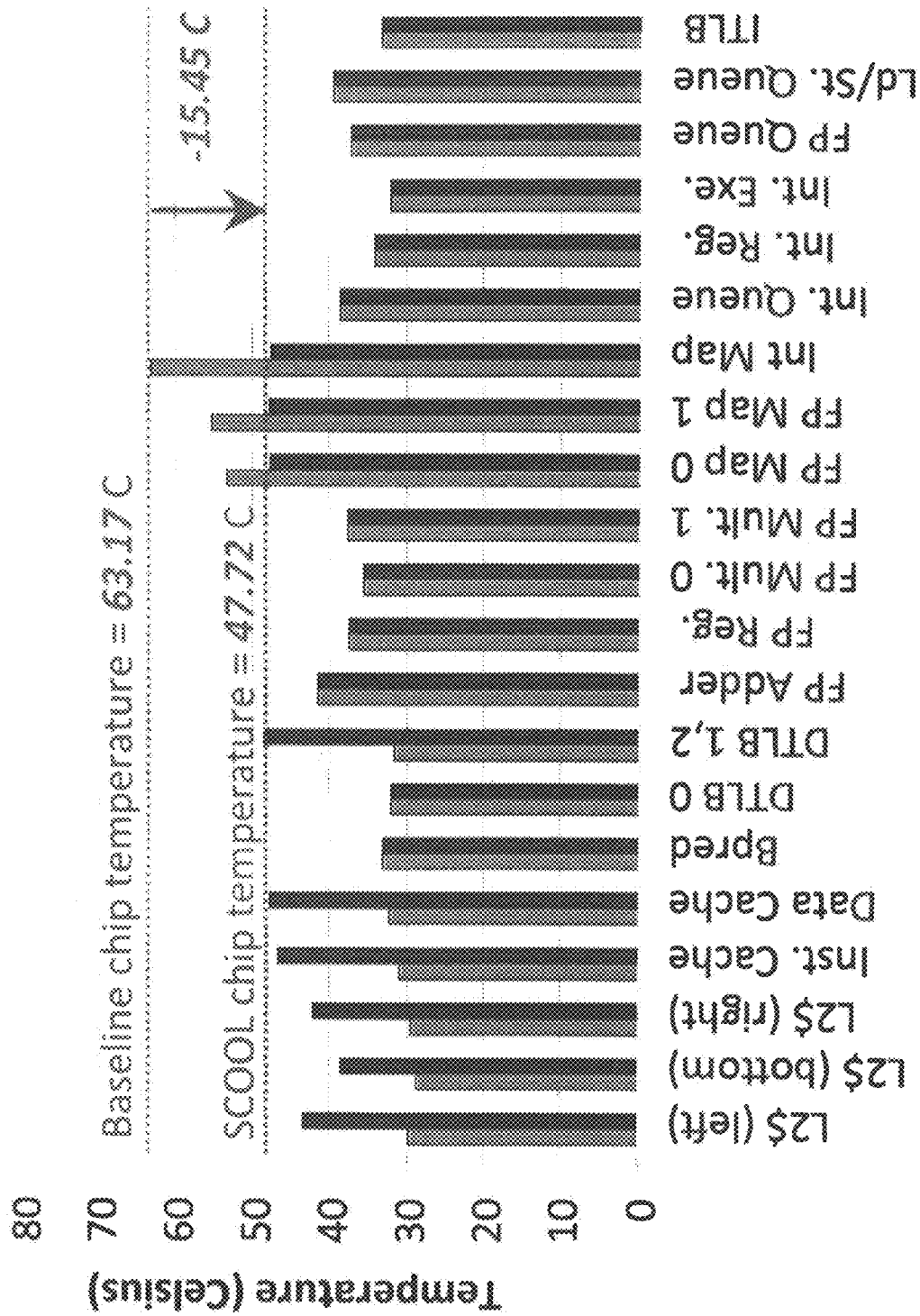
FIG. 12 is a graph illustrating the temperature of various functional units of the baseline and the sustainable self-cooling framework.
Figure 13:
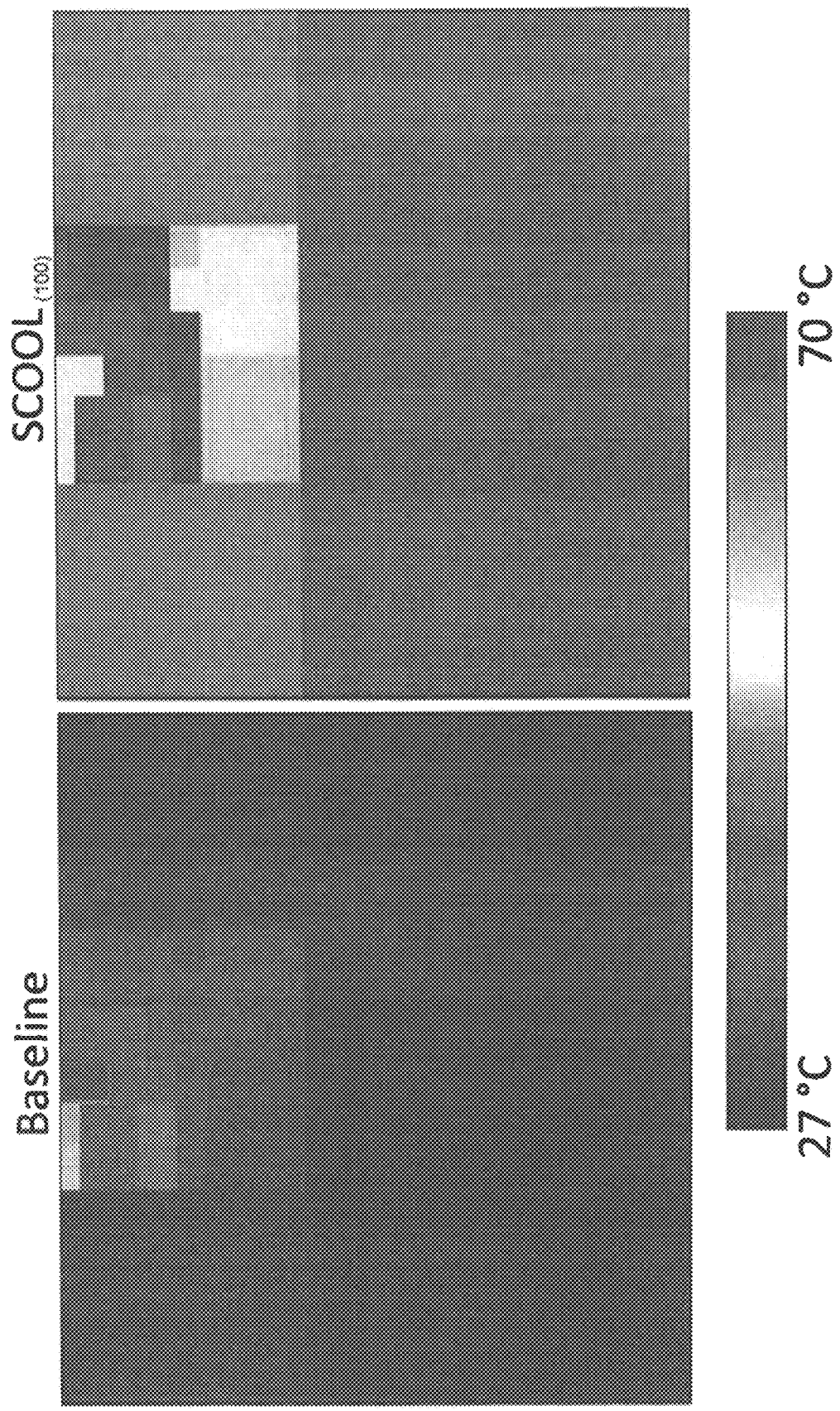
FIG. 13 is a heat map illustrating the temperature distribution in color of a processor under the baseline and the sustainable self-cooling framework.

FIG. 12 presents the temperature of the various functional units in the baseline design and in the sustainable self-cooling framework 100. As expected, the large L2 caches often run at a relatively low temperature whereas the instruction schedulers, the arithmetic units (e.g., FP Adder), and the load/store queue operate at a higher temperature. After the placement of the TEGs 102, TECs 104, and the heat sink 106 materials at the various functional units defined in FIG. 8, the temperature of the cooler areas, such as the L1 instruction and data caches as well as the L2 cache and DTLB, increases but still operates well below the temperature of hot spots while the temperature of the hot spots is significantly lowered. FIG. 13 illustrates the temperature distribution of the processor running cactusADM. The sustainable self-cooling framework 100 is able to eliminate the hot spots by leveraging the temperature difference between the functional units for TEG-102-based waste heat harvesting and TEC-104-based spot cooling effectively. As a result, the temperature of the three hot spots is lowered to 47.58° C. (by as much as 15.45° C. for the integer scheduler).

The failure of a chip is constrained by the fastest failing point in the entire chip. By reducing the temperature of hot spots in a processor, the sustainable self-cooling framework 100 effectively reduces the failure rate of the hot spots and hence reduces the failure rate of the entire chip. To quantitatively evaluate the degree of reliability impact by the sustainable self-cooling framework 100, the reliability model developed by Srinivasan et al. was used. Two major factors are modeled for processor failure, which are strongly correlated with the operating temperature, namely electromigration (EM) and time-dependent dielectric breakdown (TDDB). The other two factors for processor failure are stress migration and thermal coupling which have lower impact than EM and TDDG for smaller technology node sizes. Therefore, the reliability evaluation focuses on EM and TDDB.

Reliability is expressed in terms of mean time to failure or the expected lifetime of a processor, MTTF, and calculate MTTF caused by EM ($MTTF_{EM}$) and by TDDB ($MTTF_{TDDB}$) individually for all applications under study as follows.

$$MTTF_{EM\,(\%)} = MTTF_{EM}(SCOOL)/MTTF_{EM}(\text{Baseline})$$
$$= e(kT^{E_a}/\text{Baseline} - E_a/SCOOL) \qquad (13)$$

where $E_a$ is the activation energy for electromigration and k is Boltzmann's constant, and T is the absolute temperature in Kelvin. We use 1.1 for $E_a$ for the copper interconnect.

$$MTTF_{TDDB\,(\%)} = MTTF_{TDDB}(SCOOL)/MTTF_{TDDB}(\text{Baseline}) = (1/V)(b*T_{SCOOL} - b*T_{Baseline})*e^{(X+Y/TSCOOL + b*TBasline/k*TSCOOL - (X+Y/TBaseline + Z*TBaseline)/k*TBaseline)}$$

where a, b, X, Y and Z are fitting parameters, V is the voltage and T is the absolute temperature in Kelvin. Based on experimental data, values of a=78, b=−0.081 ev, Y=−66.8 evK, and Z=−8.37e$^{-4ev/k}$ in the MTTG$_{TDDB}$ model.

Figure 14:
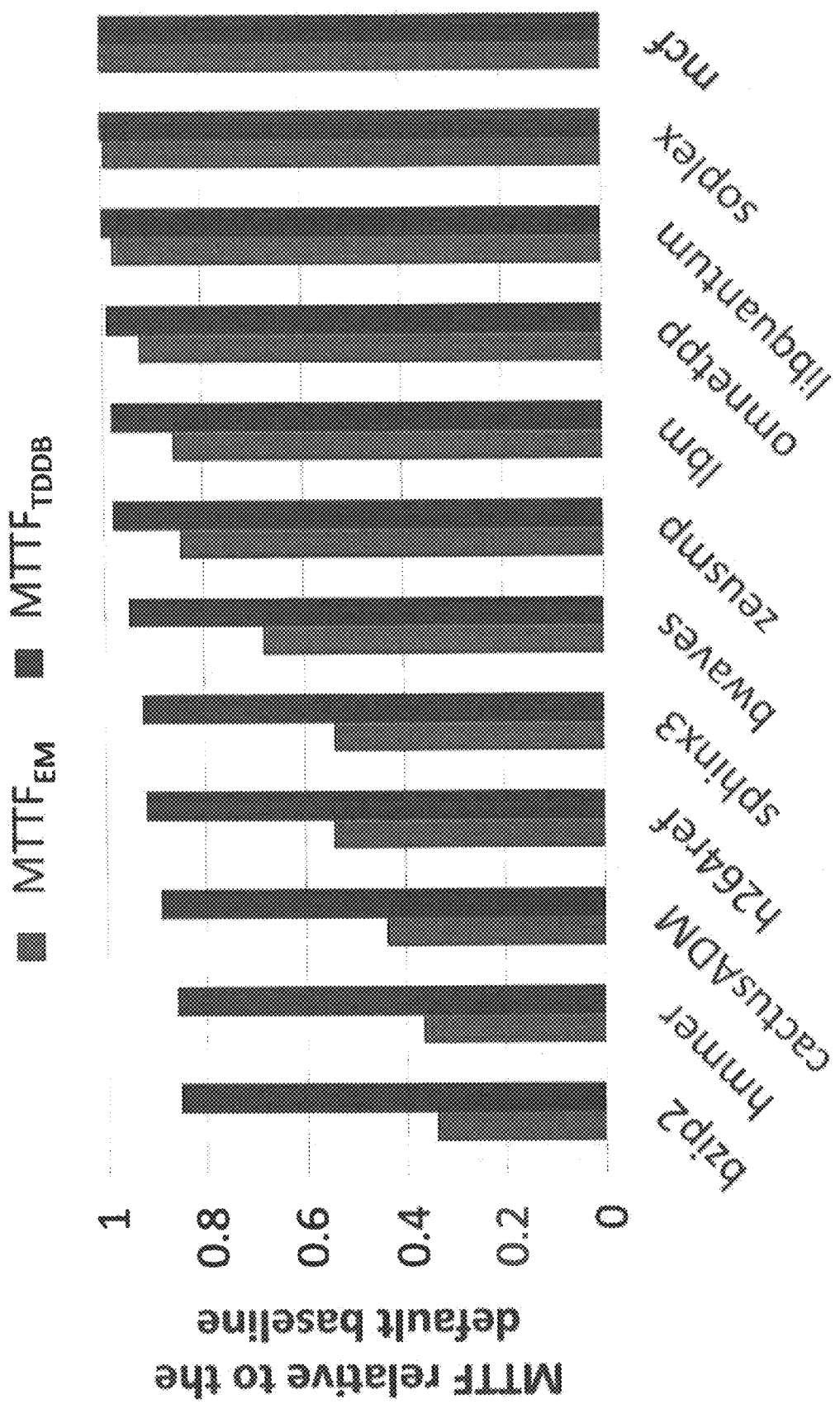
FIG. 14 is a graph illustrating the test results for $MTTF_{EM}$ and $MTTF_{TDDB}$ under the sustainable self-cooling framework in comparison to the baseline.

FIG. 14 presents the evaluation results for MTTF$_{EM}$ and MTTF$_{TDDB}$ under the sustainable self-cooling framework 100 (SCOOL) when compared to the baseline. The chip temperature improvement under SCOOL translates to an improved MTTF caused by electromigration and time-dependent dielectric breakdown. MTTF$_{EM}$ is reduced by as much as 66% for bzip2 and by an average of 29% across all SPEC2006 applications whereas MTTF$_{TDDB}$ is reduced by as much as 15% for bzip1 and by an average of 5.7%.

The L2 cache is a common location for TEG-102-based waste heat harvesting across all applications under study. With the additional thermal resistance introduced by the TEG layer, the L2 cache operates at a higher temperature than the baseline, which can increase the cache leakage power consumption. Various temperatures and the corresponding leakage power consumption are evaluated in HSPICE for the 32 nm SRAM technology node and the leakage dependence on temperature model was obtained by curve-fitting.

Figure 15:
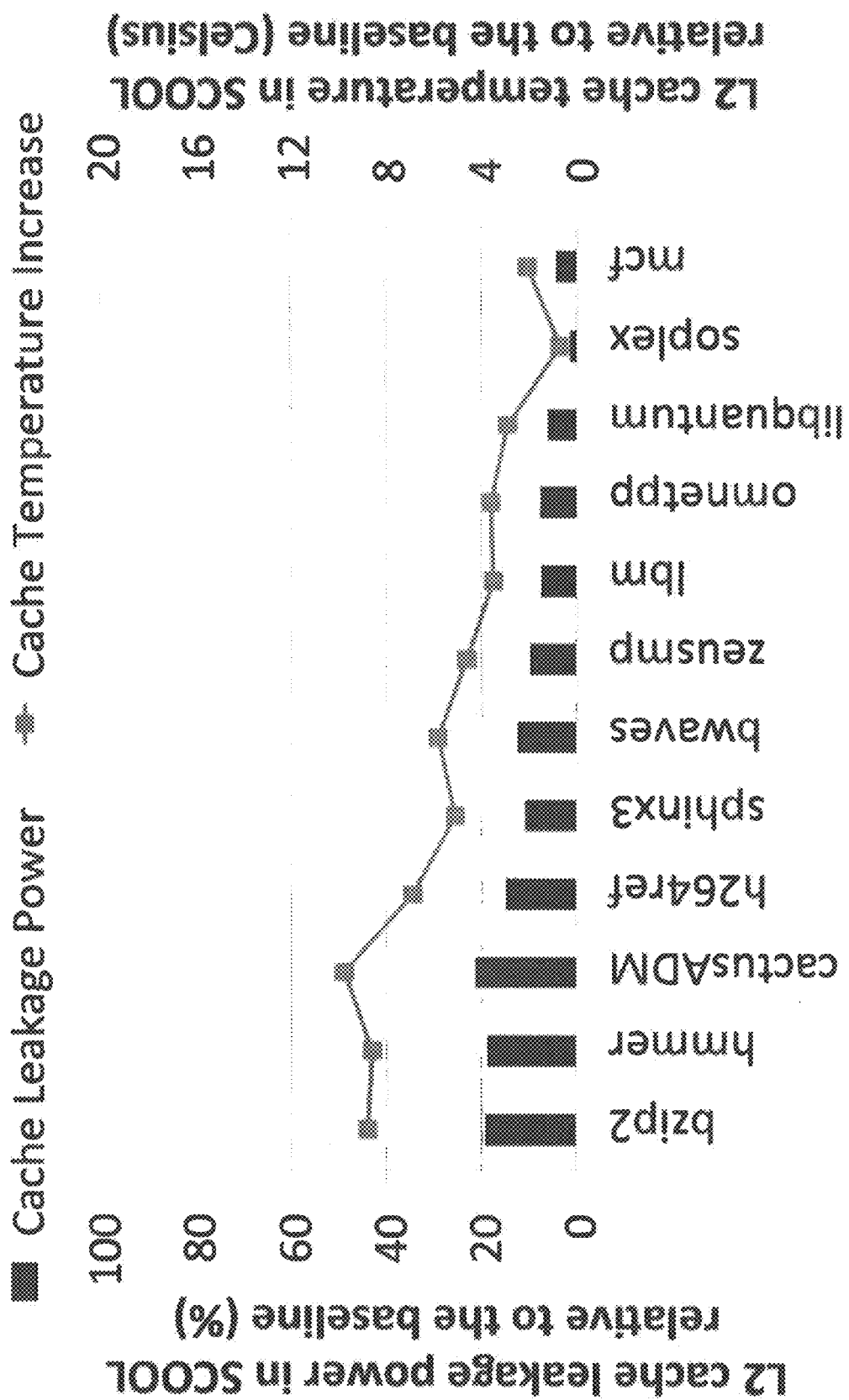
FIG. 15 is a graph illustrating the increase in the L2 cache leakage power consumption and the increase in the operating temperature under the sustainable self-cooling framework.

FIG. 15 shows the increase in the L2 cache leakage power consumption (the left y-axis) and the increase in the operating temperature (the right y-axis) under sustainable self-cooling framework 100 when compared to the baseline. cactusADM exhibits the most increase in the operating temperature of the L2 cache (9.78° C.), which translates to an increase of 21.4% in cache leakage power consumption. Overall, the cache leakage power consumption is increased by an average of 11.2%, which is insignificant when compared to the temperature reduction of hot spots and the associated leakage power saving from the hot spots. Furthermore, with the latest Fin-FET technology, the cache leakage power is expected to be significantly lower compared to the planar design (a 6× reduction). As a result, the leakage power consumption increase in the L2 cache is expected to be a small portion of the total system power consumption.

In addition to the customized TEG 102/TEC 104 placement tailored to each individual application, we evaluate the effectiveness of the sustainable self-cooling framework 100 under a fixed TEG 102/TEC 104 placement. Specifically, two placement strategies are investigated—Conservative and Majority-Wins.

In the conservative strategy, the temperature of TEG-102-covered functional units does not exceed the temperature of hot spots in the baseline. In other words, the conservative strategy gives more weight to temperature effects from TEGs 102 than waste heat harvesting opportunities. In this case, functional units whose temperatures after TEG 102 placement are likely to exceed the temperature of the hot spots in the baseline will be covered by heat sink 106 materials instead of TEGs 102. In other words, the waste heat harvesting opportunities are not fully taken advantage of. In addition, only the integer map unit is the target for spot cooling. On the other hand, the majority-wins strategy determines the final TEG 102/TEC 104 placement based on the placement decisions of the customized design for each individual application. Across all applications under study, the majority-win strategy determines whether a functional unit will be covered by a TEG 102 module or heat sink material based on what the majority of the applications favor (FIG. 8). Table 4 presents the placement of TEGs 102, TECs 104, and heat sinks 106 in the fixed designs.

TABLE 4

Placement of TEGs, TECs, and heat sink blocks under the fixed design strategies - Conservative and Majority-Wins

|  | Conservative Strategy | Majority-Wins Strategy |
| --- | --- | --- |
| TEC | Int. Map | Int. Map |
| TEG | L2 caches | L2 caches; Inst. Cache; Data Cache; Bpred; DTLB 0, 1, 2; FP Reg. 0, 1, 2, 3; FP Mult. 0, 1; Int. Exe.; FP Queue; ITLB; |
| Heat Sink | Inst. Cache; Data Cache; Bpred; DTLB 0, 1, 2; FP Adder; FP Reg. 0, 1, 2, 3; FP Mult. 0, 1; FP Map 0, 1; Int. Queue; Int. Reg.; Int. Exe.; FP Queue; Ld/St. Queue; ITLB; | FP Adder, FPMap 0, 1; Int. Queue; Int. Reg.; Ld/St. Queue; |

Figure 16:
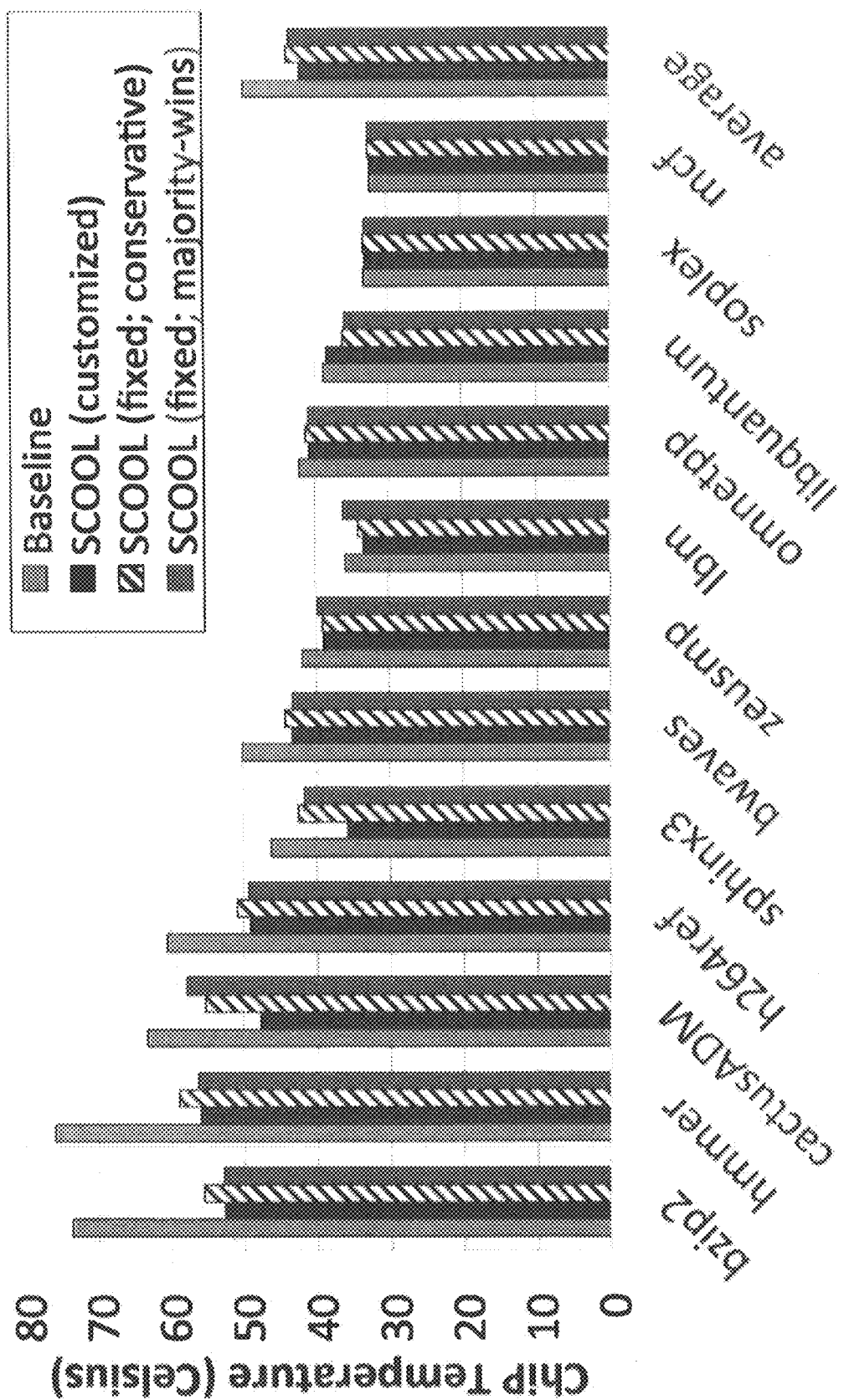
FIG. 16 is a graph illustrating the overall chip temperature for the baseline architecture and the sustainable self-cooling framework.

FIG. 16 shows the overall chip temperature under all policies—baseline, the sustainable self-cooling framework 100 (SCOOL—customized), sustainable self-cooling framework 100 (SCOOL—fixed, conservative), and SCOOL 100 (fixed, majority-wins). While the fixed placement SCOOL 100 designs are not optimized for each application's unique temperature characteristics, both fixed designs still improve the overall chip temperature significantly. The Conservative strategy reduces the chip temperature by an average of 5.8° C. while the Majority-Wins strategy reduces the chip temperature by 6.2° C.

Figure 17:
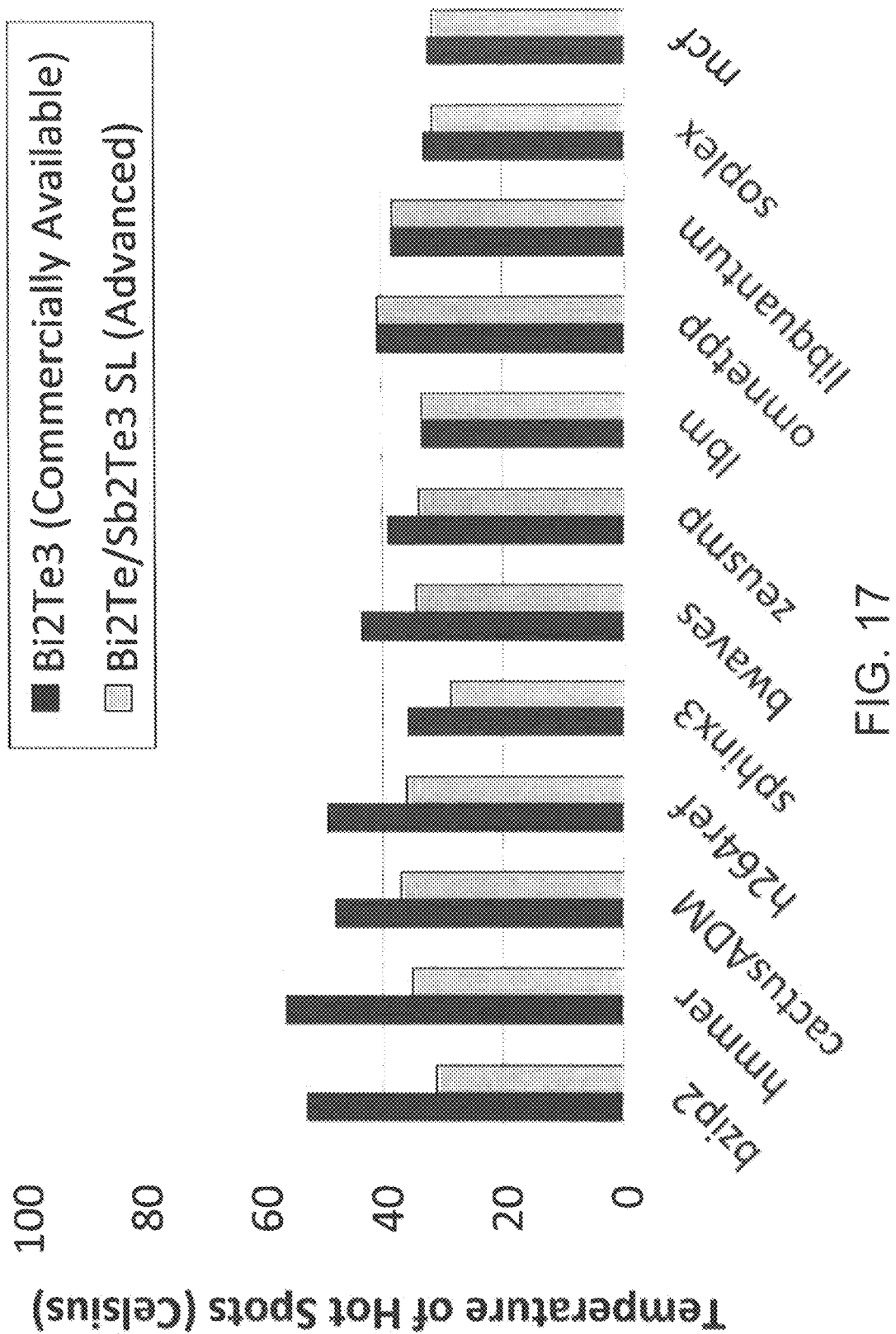
FIG. 17 is a graph showing the temperature of the CPU thermal hot spots.

The experimental evaluations presented in this paper are based on the material parameters of commercially available TEGs 102, i.e., Bismuth Telluride (Bi$_2$Te$_3$). The efficiency of such thermoelectric materials can be represented by its figure of merit (ZT). In order to maximize ZT, the power factor which depends on Seebeck coefficient and electrical conductivity needs to be maximized and the thermal conductivity should be minimized for a large temperature difference. Currently, it is challenging to further increase the ZT (around 1) of Bi$_2$Te$_3$. Therefore, many researchers have focused on nanostructured materials, e.g., Bi$_2$Te/S$_{b2}$T$_{e3}$, to enhance ZT with a reduced thermal conductivity. Table 5 shows the ZT values and the corresponding thermal conductivities for thermoelectric materials investigated within the last decade for the operating temperature range of processors (300K/27° C.). In order to project the power generation potential of the most advanced thermoelectric materials to date, we evaluate the power generation of Bi$_2$Te/Sb$_2$Te$_3$-based TEGs 102 which is used to enable TEC-based spot cooling in the sustainable self-cooling framework setup. FIG. 17 shows that the temperature of the hot spots can be significantly lower with a more advanced thermoelectric material, due to the larger ZT value of Bi$_2$Te/Sb$_2$Te$_3$-based TEGs 102. The increased efficiency of the thermoelectric materials for TEGs 102 and TECs 104 opens the door to more spot cooling opportunities resulting in much cooler chip temperature.

TABLE 5

Advanced thermoelectric materials

| Materials | Thermal Conductivity W/$_m$-K | Figure of Merit ZT = α$^2$ * σ/k |
| --- | --- | --- |
| Bi$_2$Te/Sb$_2$Te$_3$ superlattice (SL) [36] | 0.22 | 2.4 |

TABLE 5-continued

Advanced thermoelectric materials

| Materials | Thermal Conductivity W/$_m$-K | Figure of Merit ZT = $\alpha^2$ * $\sigma$/k |
|---|---|---|
| PbSe$_{0.98}$Te$_{0.02}$/PbTe Quantum dot SL [37] | 5.8 | 1.6 |
| Silicon nanowire [38] | 1.6 | 0.6 |
| BiSbTe [39] | 0.5 | 1.2 |

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A sustainable self-cooling framework comprising:
a processor of a microelectronic circuit, wherein the processor produces localized areas of high temperature on a surface of the processor that generate waste heat; and
a sustainable self-cooling architecture for cooling one or more of the localized areas of high temperature of the processor, the sustainable self-cooling architecture comprising:
one or more thermoelectric generators located proximate a first portion of the surface of the processor,
one or more thermoelectric coolers located proximate a second portion of the surface of the processor,
wherein the waste heat is converted by the one or more thermoelectric generators to power, the power used to activate the one or more thermoelectric coolers such that each of the one or more thermoelectric coolers generates a cooling effect to the second portion of the surface of the processor, and
an intermediate circuit operatively connecting the or more thermoelectric generators to the one or more thermoelectric coolers to transfer the power generated from the one or more thermoelectric generators to the one or more thermoelectric coolers.

2. The sustainable self-cooling framework of claim 1 wherein the first portion of the surface of the processor coincides with a first set of functional units of the processor that operate at a lower temperature than a high temperature of the one or more of the localized areas of high temperature.

3. The sustainable self-cooling framework of claim 2, wherein the second portion of the surface of the processor coincides with a second set of functional units of the processor that produce the high temperature of the one or more of the localized areas of high temperature.

4. The sustainable self-cooling framework of claim 3, wherein the sustainable self-cooling architecture further comprises:
one or more heat sinks located proximate a third portion of the surface of the processor, wherein the third portion of the surface of the processor coincides with a third set of functional units of the processor.

5. The sustainable self-cooling framework of claim 4, wherein each of the functional units of the processor is included in the first set of functional units, the second set of functional units, or the third set of functional units.

6. The sustainable self-cooling framework of claim 1 wherein the one or more thermoelectric generators comprise a plurality of thermoelectric generators and the intermediate circuit operatively connects a first subset of the plurality of thermoelectric generators in a first series arrangement and a second subset of the plurality of thermoelectric generators in a second series arrangement.

7. The sustainable self-cooling framework of claim 6, wherein the intermediate circuit further connects the first subset of the plurality of thermoelectric generators and the second subset of the plurality of thermoelectric generators in a parallel arrangement.

8. The sustainable self-cooling framework of claim 1, wherein a load characteristic of the one or more thermoelectric coolers is matched to a resistive value of the one or more thermoelectric generators.

9. The sustainable self-cooling framework of claim 1, wherein the intermediate circuit further comprises a voltage regulator.

10. The sustainable self-cooling framework of claim 1, wherein the sustainable self-cooling architecture further comprises:
a heat spreader interposed between the sustainable self-cooling architecture and the processor.

11. A method for cooling a processor, comprising:
utilizing one or more thermoelectric generators to generate power from waste heat associated with a first portion of a surface of a processor that produces localized areas of high temperature along the processor;
providing the power to one or more thermoelectric coolers located proximate to a second portion of the surface of the processor using an intermediate circuit electrically connecting the one or more thermoelectric generators to the one or more thermoelectric coolers; and
cooling the second portion of the surface of the processor with the one or more thermoelectric coolers located proximate the second portion of the surface of the processor, the one or more thermoelectric coolers generating a cooling effect to the second portion of the surface of the processor.

12. The method of claim 11, wherein the one or more thermoelectric generators are located proximate to the first portion of the surface of the processor and wherein the first portion of the surface of the processor coincides with a first set of functional units of the processor that operate at a lower temperature than a high temperature of the localized areas of high temperature.

13. The method of claim 12, wherein the second portion of the surface of the processor coincides with a second set of functional units of the processor that produce the high temperature of the localized areas of high temperature.

14. The method of claim 11, wherein the one or more thermoelectric generators comprise a plurality of thermoelectric generators and the intermediate circuit operatively connects a first subset of the plurality of thermoelectric generators in a first series arrangement and a second subset of the plurality of thermoelectric generators in a second series arrangement.

15. The method of claim 14, wherein the intermediate circuit further connects the first subset of the plurality of thermoelectric generators and the second subset of the plurality of thermoelectric generators in a parallel arrangement.

16. The method of claim 11, further comprising:
matching a load characteristic of the one or more thermoelectric coolers to a resistive value of the one or more thermoelectric generators.

17. A processor comprising:
a surface defining a first portion and a second portion of the surface, the processor producing localized areas of high temperature along the first portion of the surface of the processor that generate waste heat; and a sustainable self-cooling architecture for cooling one or more localized areas of high temperature of the surface, the sustainable self-cooling architecture comprising:

one or more thermoelectric generators located proximate the first portion of the surface and configured to generate power from the waste heat;

one or more thermoelectric coolers located proximate the second portion of the surface and configured to access the power generated from the one or more thermoelectric generators to produce a cooling effect to the second portion of the surface of the processor; and an intermediate circuit operatively connecting the one or more thermoelectric generators to the one or more thermoelectric coolers.

18. The central processing unit of claim 17, wherein the one or more thermoelectric generators comprise a plurality of thermoelectric generators and the intermediate circuit operatively connects a first subset of the plurality of thermoelectric generators in series and a second subset of the plurality of thermoelectric generators in a series arrangement.

19. The central processing unit of claim 18 wherein the intermediate circuit further connects the first subset of the plurality of thermoelectric generators and the second subset of the plurality of thermoelectric generators in a parallel arrangement.

20. The central processing unit of claim 17 wherein a load characteristic of the one or more thermoelectric coolers is matched to a resistive value of the one or more thermoelectric generators.

* * * * *